(12) United States Patent
Fan et al.

(10) Patent No.: US 9,247,307 B2
(45) Date of Patent: *Jan. 26, 2016

(54) INTEGRATING VIDEO SHARE AND TEXT MESSAGING WITH SET-TOP BOX AND ACCESS POINT

(71) Applicant: AT&T Intellectual Property I, L.P., Atlanta, GA (US)

(72) Inventors: James Fan, San Ramon, CA (US); Jennifer K. Lam, Fremont, CA (US); Cheng P. Liu, Johns Creek, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/752,597

(22) Filed: Jun. 26, 2015

(65) Prior Publication Data

US 2015/0296265 A1 Oct. 15, 2015

Related U.S. Application Data

(63) Continuation of application No. 12/814,001, filed on Jun. 11, 2010, now Pat. No. 9,100,707.

(51) Int. Cl.
| | |
|---|---|
| *H04N 7/173* | (2011.01) |
| *H04N 21/4788* | (2011.01) |
| *H04N 21/488* | (2011.01) |
| *H04N 21/41* | (2011.01) |
| *H04N 21/81* | (2011.01) |
| *G01D 4/00* | (2006.01) |

(52) U.S. Cl.
CPC ........... *H04N 21/4788* (2013.01); *G01D 4/004* (2013.01); *H04N 21/4131* (2013.01); *H04N 21/488* (2013.01); *H04N 21/8126* (2013.01)

(58) Field of Classification Search
USPC ......... 725/110, 131, 133, 139, 141, 151, 153; 705/412, 415; 340/870.02; 700/286
See application file for complete search history.

(56) References Cited

U.S. PATENT DOCUMENTS

| | | | |
|---|---|---|---|
| 7,496,647 B2 | 2/2009 | Karaoguz et al. | |
| 2003/0128134 A1* | 7/2003 | Fierro | H04Q 9/04 340/870.02 |
| 2003/0167178 A1 | 9/2003 | Jarman et al. | |

(Continued)

OTHER PUBLICATIONS

"M2M smart metering: where are we now?" <http://blogs.orange-business.com/live/2009/11/m2m-smart-metering-where-are-we-now.html> Accessed Sep. 10, 2010. 4 pages.

(Continued)

*Primary Examiner* — Yassin Alata
(74) *Attorney, Agent, or Firm* — Amin, Turocy & Watson, LLP

(57) ABSTRACT

Techniques provide for converged wireline and wireless services in part by employing a set-top box (STB) with machine-to-machine (M2M) communication. The STB, associated with an access point, such as a femtocell, can be used to send/receive messages, including video, to/from user equipment (UE) via a core network. A monitoring system includes a sensor component that is triggered under specified conditions, and the STB records events in response to the trigger, where a recorded event can be sent as a message to the UE. The STB or associated remote control can indicate a received message to a user, who can view the message on the STB, remote control, or associated television. A meter component is associated with the STB via the femtocell or other desired connection. The STB can receive and store utility meter readings for validation or dispute by the user.

20 Claims, 23 Drawing Sheets

(56) References Cited

U.S. PATENT DOCUMENTS

| | | | |
|---|---|---|---|
| 2008/0022322 A1* | 1/2008 | Grannan | H04N 5/44591 725/78 |
| 2011/0095903 A1* | 4/2011 | Gudlavenkatasiva | G01D 4/004 340/870.02 |

OTHER PUBLICATIONS

"The NES System Components" <http://www.echelon.com/metering/nes_system_components.htm> Accessed Sep. 10, 2010. 2 pages.

"The NES Smart Metering System" <http://www.echelon.corn/metering/datasheets/SmartMetering_System_IEC_Fall09.pdf> Accessed Sep. 10, 2010. 6 pages.

Final Office Action mailed Jun. 19, 2013 for U.S. Appl. No. 12/814,001, 24 pages.

Office Action mailed Sep. 11, 2012 for U.S. Appl. No. 12/814,001, 25 pages.

Office Action mailed Dec. 17, 2014 for U.S. Appl. No. 12/814,001, 27 pages.

* cited by examiner

INTEGRATING VIDEO SHARE AND TEXT MESSAGING WITH SET-TOP BOX AND ACCESS POINT

CROSS-REFERENCE TO RELATED APPLICATION

This application is a continuation of, and claims priority to, U.S. patent application Ser. No. 12/814,001, filed Jun. 11, 2010, and entitled "INTEGRATING VIDEO SHARE AND TEXT MESSAGING WITH SET-TOP BOX AND ACCESS POINT," the entirety of which is hereby incorporated herein by reference.

TECHNICAL FIELD

The subject application generally relates to wireless communications, e.g., to integration of video share and text messaging with a set-top box and access point.

BACKGROUND

Conventionally, service providers can provide wired services and wireless services. However, there is no convergence of wired and wireless services. For instance, wireless service providers offer text messaging and video share functionalities to their subscribers. These features allow wireless subscribers to do messaging and video share among other wireless subscribers. Also, Internet Protocol (IP) services, such as phone (e.g., Voice over IP (VoIP)), Internet, and IP Television (IPTV), can be offered by wireline broadband service providers. There also can be phone services provided via the plain old telephone service (POTS).

Further, many utility providers have begun to deploy smart meters to residents. These smart meters are equipped with a machine-to-machine (M2M) chipset that can send meter readings to the data centers of utility providers. The smart meter with a load balancer not only can save operational costs, as there is no need to dispatch a technician to do meter reading every month, but also can allow utility providers to dynamically adjust/balance peak hour electricity load.

Thus, conventionally, wireless services are processed through wireless interfaces and wireline services are processed through wireline interfaces. While providing services in this manner is adequate in many cases, there are a number of inefficiencies and a number of conditions that are not adequately considered and addressed. For instance, due to incompatibility of IPTV standards, there have not been scalable solutions to send messages or perform video share with IPTV users. Also, utility providers (e.g., water company, gas provider, electric provider, etc.) typically do wholesale purchase of the wireless services to support smart meters from wireless service providers, but the Quality of Service (QoS) of this wireless service is normally difficult to guarantee due to a variety of reasons, such as bad weather conditions, macrocell congestion, etc. Further, use of the remote meter reading by utility providers has caused many complaints by end users, who claim that their monthly bills from the utility providers are inaccurate.

It is desirable to enable efficient message sending and video sharing by IPTV users. It is also desirable to provide reliable communication of information related to meter reading to remote data centers of utility providers. Further, it is desirable to facilitate ensuring accuracy and verification of remote meter readings by utility providers.

DETAILED DESCRIPTION

Figure 1:
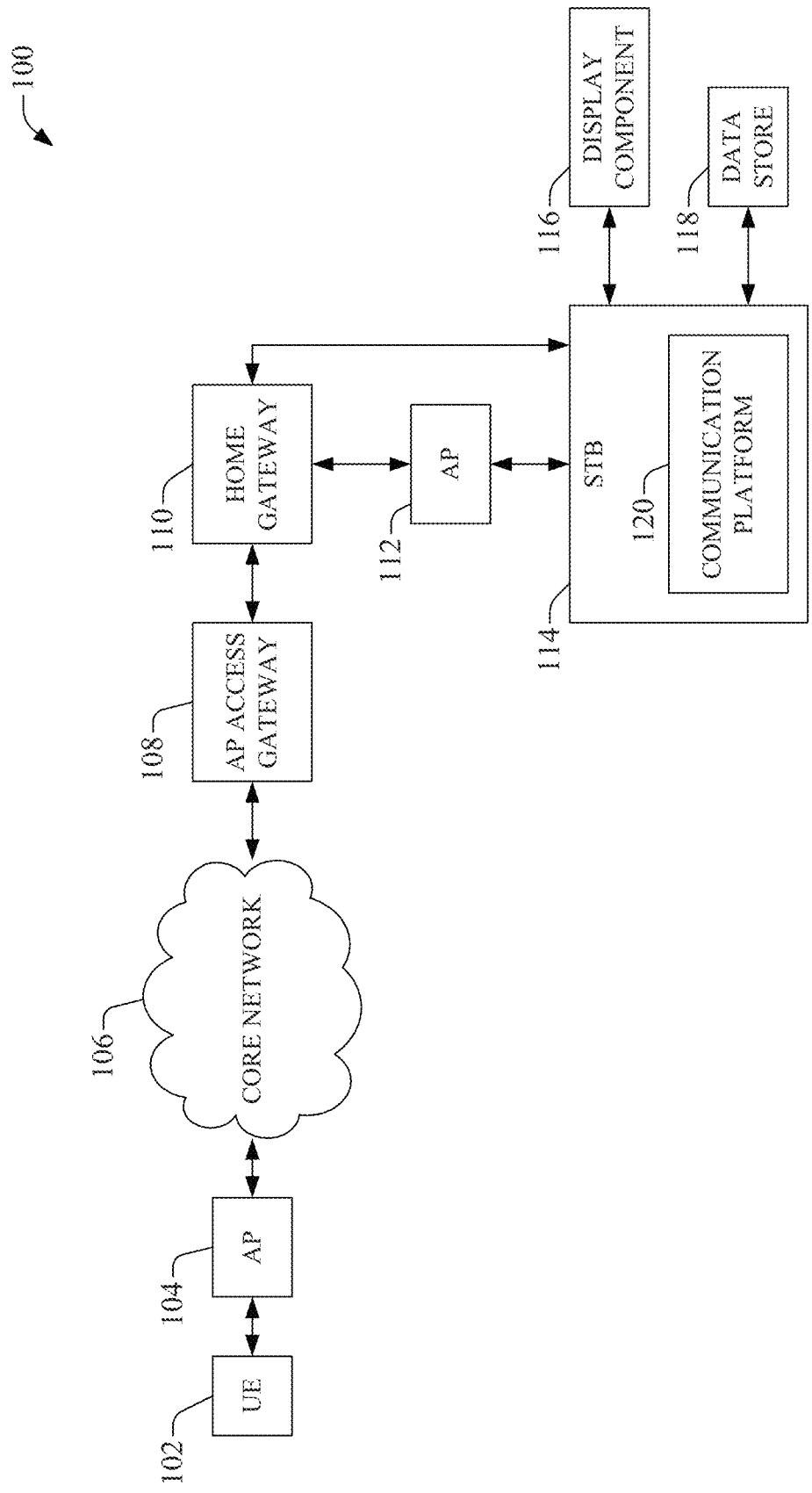
FIG. 1 is a block diagram of an example system that can facilitate communication of messages (e.g., text messages, video content, audio content, etc.) associated with a set-top box (STB) in accordance with various aspects and embodiments of the disclosed subject matter.

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

Systems, methods, and devices that provide converged wireline and wireless services in part by employing a set-top box (STB) with machine-to-machine (M2M) communication (e.g., M2M chipset usable for communication) are presented. The STB can be associated with an access point (AP) (e.g., femtocell, picocell, etc.), and can be used to send or receive messages, including video, to or from user equipment (UE) (e.g., mobile communication device, such as a cellular phone or laptop) via the AP and core network (e.g., 2G, 3G, 4G, or xG network, where x is virtually any desired integer or real value). The STB can map a received message or video share content (e.g., text message, multimedia message, video clip, audio clip, visual image, etc.) to a dedicated channel or dedicated real estate on a television (TV) screen (e.g., dedicated portion of a TV screen), such as an Internet Protocol TV (IPTV) screen. Since the message or video share content is communicated via the core network, the message or video share content can bypass the IPTV network.

In an aspect, when a message(s) is received from another communication device (e.g., UE) via the core network, the STB can check to determine whether there is another message or notification (e.g., emergency message) that has a higher priority level than the received message, wherein it can be desirable to communicate and display the message or notification with a higher priority level first on a desired display screen (e.g., IPTV screen, display screen on the STB, display screen on the remote control component). When a remote user using a UE, for example, sends an urgent message (e.g., text message, video content, etc.) to the STB, the STB can transmit or present an indicator (e.g., visual, audio, or other sensory-related signal), and/or can have an associated remote control component (e.g., two-way remote control component) transmit or present the indicator, to alert the subscriber, who is in the area of the STB and/or remote control component, of the urgent message. All or at least a desired portion of received messages (e.g., text messages, video share content, etc.) can be stored in a data store (e.g., digital video recorder (DVR)) associated with the STB for later viewing. A subscriber can delete a message from the data store, as desired.

In another aspect, the subscriber associated with STB can view a message, which is received by the STB, on a display of the display component (e.g., IPTV) associated with the STB, a display (e.g., Liquid Crystal Display (LCD) screen, touch screen, etc.) on the STB, or a display on the remote control component. As desired, the subscriber can utilize the remote control component or an interface (e.g., keypad, QWERTY keyboard, touch screen, etc.) on the STB to compose a response message, or can select from a predefined number of preconfigured messages (e.g., "funny video clip", "you look great in this picture", etc.) to respond to the received message, wherein the response message can be viewed on the TV display screen, STB display or remote control component display, and the response message can be transmitted from the STB to the UE, for example, via the core network. As a result, if the subscriber does not like or desire using a computer (e.g., personal computer (PC)) or wireless communication device (e.g., cellular phone), the subscriber can easily use the STB and/or associated remote control component to enjoy text messaging, video sharing, and other messaging options, as, for instance, there are many persons who are much more used to using, and much more comfortable using, a remote control than a PC or cellular phone.

In still another aspect, as desired, the received message also can be forwarded, manually or automatically, to another communication device (e.g., UE, computer, landline phone, etc.). For example, the subscriber may be at a location different than the location of the STB, and can program the STB to forward all messages or a desired portion of the received messages (e.g., messages that at least meet a predefined priority threshold level) to another communication device associated with the subscriber, wherein the subscriber can access the forwarded message using the other communication device. As another aspect, the subscriber can receive and/or view the message on the STB, and can manually enter an instruction to the STB to forward the received message to a desired communication device, and, in response, the STB can forward the received message to the desired communication device.

In yet another aspect, the STB can be used to facilitate establishing a real time video share session with, for example, a UE (e.g., UE in a remote location), wherein video content can be shared between the UE and STB (e.g., video content can be communicated from the UE to the STB; or video content can be communicated from the STB to the UE). As desired, the video share session can be recorded and a copy of it stored in the data store, wherein the subscriber associated with the STB, user, or other desired persons, can view the video share session at a later time. An additional benefit to being able to establish the real time video share session between the STB and the UE is that mobile wireless devices, such as UEs, can have limited storage capacity, and using the data store associated with the STB to store video share content from the UE can free up the data store associated with the UE so that the UE's data store can have storage available for recording other information (e.g., text, video content, audio content, etc.).

In an embodiment, a monitoring system (e.g., home or business monitoring or security system) can be associated with the STB, wherein the monitoring system can monitor conditions associated with a defined physical area (e.g., inside and/or outside a home or business). The monitoring system can comprise one or more capture components (e.g., video cameras that can capture video and/or audio) that can monitor and capture events occurring in the respective area being monitored by the respective capture component. The monitoring system also can include one or more sensor components (e.g., audio sensor, movement sensor, heat sensor, etc.) that can sense (e.g., detect) a change in condition, for example, relating to noise, movement, emanating heat, etc., and in response to sensing such change in condition, the sensor component can send an indicator(s) that can identify one or more characteristics (e.g., change in condition occurred, type of change in condition, location of condition change, etc.) relating to the sensed change in condition to the STB. The capture components can be continuously capturing and recording events, or can be triggered to capture and record events in response to a sensed change in condition. A capture component(s) can be used to capture events relating to the sensed change in condition and the captured events can be recorded and stored in the data store associated with the STB. In accordance with predefined notification criteria, the STB can send a notification message and/or associated video content (e.g., with or without associated audio content) to a desired UE, via, for example, the core network, to notify the subscriber of the sensed change in condition, and the UE can be used to view the notification message and/or associated video content. As desired, the STB can be used as a primary or auxiliary device to access monitored conditions as captured by the one or more capture components, as, for instance, the monitoring system can provide another access component that can be used to store and access monitored conditions, wherein this access component can be the primary or auxiliary device used for accessing monitored conditions.

In accordance with an embodiment, a meter component (e.g., a smart meter) can be associated with the STB via the subscriber's AP (e.g., femtocell, picocell, etc.) and/or another desired connection, such as the core network. The meter component can include one or more communication interface modules, such as an M2M communication interface module, Ethernet interface module, and/or other desired communication interface module (e.g., Wi-Fi, Wi-Max, Bluetooth, etc.), which can be employed to communicate information, such as information relating to meter readings associated with a utility provider and the subscriber, from the meter component to a remote data center associated with the utility provider via the AP (e.g., femtocell, picocell) associated with the subscriber or via a macrocell, such as a base station. In an aspect, the communication platform (e.g., M2M interface) of the meter component can communicate the information to the STB via the communication platform (e.g., M2M interface) of the STB, and the STB can receive and store the information in the data store associated with the STB. With regard to the wireless interface (e.g., Wi-Fi interface), for example, the meter component can include a wireless locator component that can monitor a specified area around the meter component and can detect an available wireless communication connection (e.g., Wi-Fi) and the meter component can establish a wireless communication connection to the subscriber's home gateway or another home gateway, when desired and/or allowed (e.g., when the utility provider allows connection with a secondary home gateway as a back-up choice).

In another aspect, if the meter component only has a core network connection available for communication information, the meter component can be configured to communicate the information to the remote data center via the subscriber's AP (when so equipped). If the subscriber's AP is not available, the meter component can communicate the information to the remote data center via a macrocell communication connection.

In still another aspect, when information (e.g., meter reading information) is ready to be sent to the remote data center of the utility provider, the information can be transmitted to the remote data center via a desired communication path (e.g., from the meter component to the remote data center via the core network, via the subscriber's AP to the core network to the remote data center, or other desired path). As desired, regardless of the communication path employed, the information can be communicated to the STB via a desired communication connection (e.g., the subscriber's AP, Ethernet, Wi-Fi) and stored in the data store associated with the STB. As desired, the subscriber can retrieve the information from the data store, for example, using the remote control component or STB interface (e.g., keypad, keyboard, etc.), and display the information on the STB display, TV display, or display of another monitoring device (e.g., home monitoring device for monitoring utility usage), and can check the information for accuracy. If the subscriber determines that the information (e.g., meter reading information and/or billing) is accurate, the subscriber can indicate that the information is valid, and the valid indicator can be included with the information and transmitted to the remote data center via a desired connection (e.g., via the M2M communication interface and subscriber's AP); if the subscriber determines that the information is not accurate, the subscriber can indicate that the information is disputed (e.g., incorrect amount of utility usage, incorrect amount billed, etc.), and the dispute indicator (e.g., dispute ticket) can be included with the meter-reading related information and transmitted to the remote data center via the desired connection. As desired, in addition or as an alternative to using the STB to review the meter reading-related information, such information can be communicated to a computer or wireless communication device of the subscriber, via a desired communication connection, for storage, review, validation, and/or dispute by the subscriber.

As used in this application, the terms "component," "system," "platform," "interface," "module," and the like can refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment," "mobile station," "mobile," "subscriber station," "communication device," "access terminal," "terminal," "handset," and similar terminology, refer to a wireless device (e.g., cellular phone, smart phone, computer, personal digital assistant (PDA), set-top box, Internet Protocol Television (IPTV), electronic gaming device, multi-media recorder/player, video recorder/player, audio recorder/player, printer, etc.) utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "home Node B (HNB)," "femto access point," "femtocell," "pico access point," "picocell," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," and the like are employed interchangeably throughout the subject specification, unless context warrants particular distinction(s) among the terms.

The following abbreviations are relevant to the subject specification.

2G Second Generation
3G Third Generation
3GPP Third Generation Partnership Project
4G Fourth Generation
AGPS Assisted GPS
AP Access Point
ADSL Asymmetric Digital Subscriber Line
AWS Advanced Wireless Services
BRAS Broadband Remote Access Server
BTA Basic Trading Area
CDMA Code Division Multiple Access
CN Core Network
CS Circuit-Switched
CSCF Call Session Control Function
CPE Customer Premise Equipment
CPN Customer Premise Network
DHCP Dynamic Host Configuration Protocol
DSL Digital Subscriber Line
DSLAM Digital Subscriber Line Access Multiplexer
E911 Enhanced 911
FCC Federal Communications Commission
FL Forward Link
GGSN Gateway GPRS Service Node
GPRS General Packet Radio Service
GPS Global Positioning System
GW Gateway
HAP Home Access Point
HSS Home Subscriber Server
ISDN Integrated Services Digital Network
UE User Equipment
UTRAN Universal Terrestrial Radio Access Network
IMS IP Multimedia Subsystem
IP Internet Protocol
ISP Internet Service Provider
MSA Metropolitan Statistical Areas
MSISDN Mobile Subscriber ISDN Number
MTA Major Trading Areas
NAT Network Address Translation
NTP Network Time Protocol
O&M Operation and Maintenance
PC Personal Computer
PCS Personal Communications Service
PS Packet-Switched
PSTN Public Switched Telephone Network
RAN Radio Access Network
RBS Radio Base Station
RL Reverse Link
RNC Radio Network Controller
RSA Rural Service Area
SGSN Serving GPRS Support Node
SIP Session Initiation Protocol
USSD Unstructured Supplementary Service Data
VPN Virtual Private Network
WAP Wireless Application Protocol
WCDMA Wideband CDMA
XDSL Asynchronous-DSL or Synchronous-DSL Service providers can provide wired services and wireless services. However, conventionally, there is no convergence of wired and wireless services. For instance, wireless service providers offer text messaging and video share functionalities to their subscribers. These features allow wireless subscribers to do messaging and video share among other wireless subscribers. Further, some utility providers employ smart meters that can wirelessly communicate meter readings to a remote data center of the utility provider via the mobile core network. Also, Internet Protocol (IP) services, such as phone (e.g., Voice over IP (VoIP)), Internet, and IP Television (IPTV), can be offered by wireline broadband service providers. There also can be phone services provided via the plain old telephone service (POTS).

However, conventionally, wireless services are processed through wireless interfaces and wireline services are processed through wireline interfaces. While providing services in this manner is adequate in many cases, there are a number of inefficiencies and a number of conditions that are not adequately considered and addressed.

System(s), method(s), and device(s) that provide converged wireline and wireless services in part by employing a set-top box (STB) with a communication platform comprising machine-to-machine (M2M) communication are presented. The STB, associated with an AP, such as a femtocell, can be used to send/receive messages, including video (e.g., video share sessions), to/from a UE via a mobile core network. A The STB also can be associated with a monitoring system, which monitors a physical area associated with the subscriber. The STB can receive captured events (e.g., video and/or audio) from the monitoring system, for example, in response to a sensor component being triggered after sensing a change in conditions with regard to the monitored physical area. In accordance with predefined presentation criteria, an alert indicator and/or a desired portion of the captured events can be sent as a message to the UE, wherein the UE can be used to access information (e.g., captured events) relating to the sensed change in condition and/or access information regarding current conditions of the monitored physical area. When a message is received by the STB, the STB or associated remote control can indicate (e.g., via visual, audio, or other sensory indicator(s)) a received message to a user, who can view the message on the STB, remote control, or associated television. A meter component is associated with the STB via the subscriber's AP or other desired connection (e.g., Ethernet connection or Wi-Fi connection with the subscriber's home gateway). The STB can receive and store utility meter readings for validation or dispute by the user, and a copy of the meter reading, including information relating to the subscriber's validation or dispute of the meter reading, can be communicated to the remote data center of the utility via a desired wireless (e.g., via the subscriber's AP) or wireline connection.

Referring to the drawings, FIG. 1 is a block diagram of an example system 100 that can facilitate communication of messages (e.g., text messages, video content, audio content, visual images, etc.) associated with an STB in accordance with various aspects and embodiments of the disclosed subject matter. The system 100 can provide converged wireline and wireless services in part by enabling the STB to establish a wireless communication connection (e.g., machine-to-machine (M2M) communication connection) with communication devices (e.g., UE, meter component, etc.).

In an aspect, the system 100 can include a desired number of UEs, such as UE 102 (e.g., mobile and/or wireless communication device, such as a mobile phone (e.g., 3GPP UMTS phone), personal digital assistant (PDA), computer, IP television (IPTV), gaming console, STB, multi-media recorder/player, video recorder/player, audio recorder/player, printer, etc.), in a communication network environment. The UE 102 can be located in a wireless portion (e.g., region) of the communication network, for example. The UE 102 can be connected (e.g., wirelessly connected) to an AP 104 (e.g., macro AP, femto AP, pico AP, etc.) that can serve a specified coverage area to facilitate communication by the UE 102 and other UEs (not shown) in the wireless communication network environment. The AP 104 can serve a respective coverage cell (e.g., macrocell, femtocell, picocell, etc.) that can cover a specified area, and the AP 104 can service mobile wireless devices, such as UE 102, located in the respective area covered by the cell, where such coverage can be achieved via a wireless link (e.g., uplink (UL), downlink (DL)). When an attachment attempt is successful, the UE 102 can be served by the AP 104 and incoming voice and data traffic can be paged and routed to the UE 102 through the AP 104, and outgoing voice and data traffic from the UE 102 can be paged and routed through the AP 104 to other communication devices (e.g., another UE). In an aspect, the UE 102 can be connected and can communicate wirelessly using virtually any desired wireless technology, including, for example, cellular, Wi-Fi, Wi-Max, wireless local area networks (WLAN), etc.

The AP 104 can be associated with a core network 106 (e.g., 2G, 3G, 4G, or xG network, where x can be virtually any desired integer or real value) that can facilitate wireless communication by the UE 102 and/or other UEs associated with the core network 106 with other communication devices (e.g., wireless communication devices, wireline communication devices) in the communication network environment. The core network 106 can facilitate routing voice and data communications between a communication device(s), such as UE 102, and other communication devices (e.g., phone, computer, email server, STB, multimedia server, audio server, video server, news server, financial or stock information server, other communication devices associated with the Internet, etc.) associated with the core network 106 in the communication network environment. The core network 106 also can allocate resources to the UEs 102 in the network, convert or enforce protocols, establish and enforce Quality of Service (QoS) for the UEs 102, provide applications or services in the network, translate signals, and/or perform other desired functions to facilitate system interoperability and communication in the wireless communication network. The core network 106 further can include desired components, such as routers, nodes, switches, interfaces, controllers, etc., that can facilitate communication of data between communication devices in the communication network environment.

In another aspect, an AP access gateway 108 (e.g., femtocell access gateway) can be associated with (e.g., connected to) the core network 106 to facilitate communication between UEs, such as UE 102, associated with the core network 106 and other communication devices (e.g., STB, meter component) associated with the AP access gateway 108. The AP access gateway 108 can be associated with a wireless carrier data center (not shown in FIG. 1), for example. In still another aspect, the AP access gateway 108 can be connected to a home gateway 110 to facilitate communication by communication devices associated with the home gateway 110 in a physical location (e.g., home, business, etc.) wherein the home gateway 110 is located. The home gateway 110 can comprise one or more types of communication interfaces, including a wireless connection(s), Ethernet, landline for phone, IEEE1394, and/or USB. The home gateway 110 can facilitate voice and data communication via one or more types of communication connections, including, for example, wireline, Broadband, access network, POTS network, Wi-Fi, Wi-Max, DSL (e.g., DSL, ADSL, XDSL, etc.), Bluetooth, etc. In an aspect, a Virtual Private Network (VPN) connection or tunnel can be established between the home gateway 110 and AP access gateway 108 to facilitate communication between communication device connected to the home gateway 110 and the core network 106 (e.g., mobile core network).

The home gateway 110 can be associated with an AP 112 (e.g., femtocell, picocell, etc.) that can be used to facilitate wireless communication by wireless communication devices associated with the AP 112. The AP 112 can facilitate wireless communication with wireless communication devices in a manner similar to that of AP 104, as more fully disclosed herein. In an embodiment, the AP 112 can be configured to cover a relatively smaller coverage area than a macro AP, such as an area associated with a home or business.

In an aspect, the system 100 can comprise an STB 114 that can be associated with (e.g., wireless connection with) the AP 112 and/or associated with (e.g., have a Wi-Fi connection or wireline connection with) the home gateway 110, and also can be associated with a display component 116 (e.g., IPTV or other display device). The STB 114 can be used to receive information, such as video content, visual images, audio content, textual content, etc. (e.g., movies, TV broadcasts, music, text messages, etc.), for example, via the home gateway 110 and/or AP 112, wherein the received information can be provided to the display component 116 for presentation (e.g., display of video or messages, broadcast of audio, etc.) by the display component 116. The STB 114 also can be connected to a data store 118 (e.g., DVR) that can have a desired amount of storage available to store information received by, or generated using, the STB 114. Data storage in the data store 118 can be managed by the STB 114 and/or another desired storage management device (not shown), and data can be purged from the data store 118, when desired, to make storage space available for other content.

In an embodiment, the STB 114 can comprise a communication platform 120 that can be employed to enable the STB 114 to wirelessly connect to the AP 112 to facilitate wireless communication by the STB 114 with other communication devices, such as UE 102, in the communication network environment. The communication platform 120 can be or can comprise an M2M chipset that can be used to establish a wireless connection with the AP 112. The communication platform 120 also can be employed to establish a wireline connection (e.g., Ethernet connection) with, for example, the home gateway 110.

In an aspect, the STB 114 can send or receive messages, including text messages, video content, audio content, images (e.g., photographs), etc., to or from UEs, such as UE 102, using the communication platform 120, via the AP 120 and/or the home gateway 110. When a message is received from UE 102 by the STB 114, the STB 114 can map the received message or content to a dedicated channel (e.g., dedicated TV channel) or dedicated real estate on the display screen (e.g., dedicated portion of the display screen) on the display component 116. Since the message or content (e.g., video share content) is communicated via the core network 106, the message or content can bypass the IPTV network.

Figure 2:
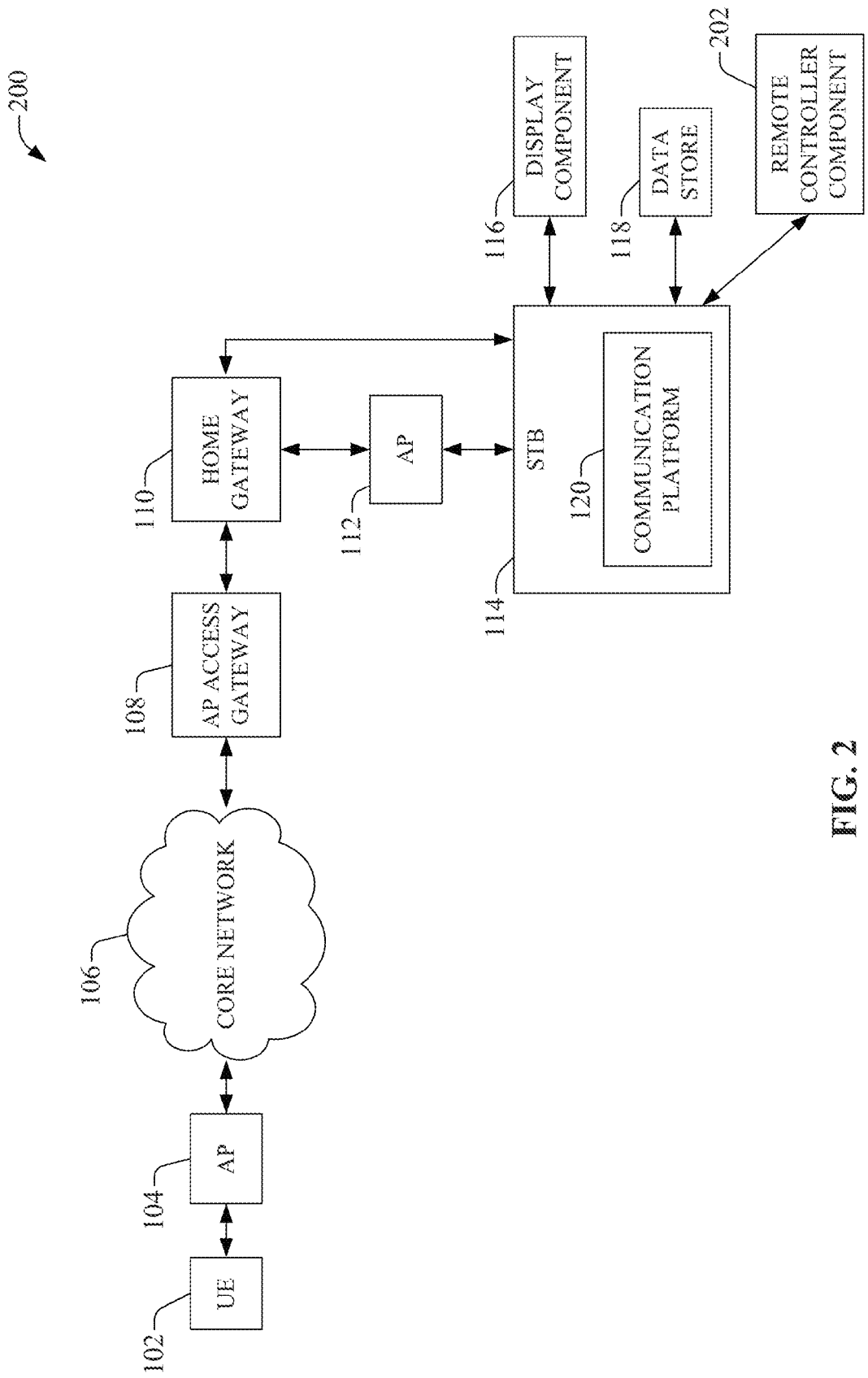
FIG. 2 depicts a block diagram of an example system that can employ a remote control component to facilitate communications associated with the STB in accordance with an aspect of the disclosed subject matter.

Referring briefly to FIG. 2 (along with FIG. 1), depicted is a block diagram of an example system 200 that can employ a remote control component (e.g., two-way remote control unit) to facilitate communications associated with the STB 114 in accordance with an aspect of the disclosed subject matter. The system 200 can comprise one or more UEs, including UE 102, AP 104, core network 106, AP access gateway 108, home gateway 110, AP 112, STB 114, display component 116, data store 118, and communication platform 120 that each can comprise the same or similar as, or can comprise the same or similar functionality as, respective components (e.g., respectively named or numbered components) such as more fully described herein, for example, with regard to system 100, system 300, system 400, etc.

In an aspect, the STB 114 can be associated with (e.g., wirelessly connected to) a remote control component 202. The remote control component 202 can comprise an interface(s) (e.g., key pad; keyboard, such as a QWERTY keyboard; display screen, such as an LCD screen or touch screen; etc.) that can be employed to select options associated with display of received messages, content, and/or broadcasts (e.g., TV or audio broadcasts, etc.), and/or select options, enter textual information, etc., to facilitate controlling operations of the STB 114, and composing messages and sending messages to other communication devices, such as UE 102, in the communication network environment. The remote control component 202 also can include a display screen that can be used to display received messages or information associated therewith (e.g., name or phone number of message sender, type of message received, etc.), when desired, and also can present received indicators, such as visual indicators (e.g., flashing light and/or text), audio indicators (e.g., audible beeps), and/or vibration indicators, to facilitate alerting the subscriber of a received message (e.g., urgent message). As desired, different indicators or different combinations of indicators can be employed for respective message priority levels to facilitate enabling a user to identify the priority level of a received message based at least in part on the indicator or combination of indicators employed with regard to the received message.

In another aspect, when a message(s) is received via the core network 106 from the UE 102, the STB 114 can analyze the message and/or other received or pending messages to check the respective priority levels of the messages. With regard to a particular received message, the STB 114 can analyze the message's priority level and can determine whether there is another message or notification (e.g., emergency message) that has a higher priority level than the particular received message, wherein it can be desirable to first communicate and display the message or notification with a higher priority level first on the display screen of the display component 116 or other desired display screen. In another aspect, when a remote user using a UE 102, for example, sends an urgent message (e.g., text message, video content, etc.) to the STB 114 via the core network 106, the STB 114 and/or associated remote control component 202 can transmit or present an indicator (e.g., visual, audio, or other sensory-related signal) to alert the subscriber, who is in the area of the STB 114 and/or remote control component 202, of the urgent message. The subscriber can use the remote control component 202 or STB 114 to view the message on the desired display screen. All or at least a desired portion of received messages (e.g., text messages, video share content, etc.) can be stored in the data store 118 associated with the STB 114 for later viewing. A subscriber can delete a message from the data store 118, as desired, using the STB 114 or associated remote control component 202.

In another aspect, the subscriber associated with STB 114 can view a received message on the display screen of the display component 116, a display screen (e.g., LCD screen, touch screen, etc.) on the STB 114, or the display screen on the remote control component 202. As desired, the subscriber can utilize the remote control component 202 or an interface (e.g., keypad, QWERTY keyboard, touch screen, etc.) on the STB 114 to compose a message (e.g., an originating message, a response message to a received message), or can select from a predefined number of preconfigured messages (e.g., "funny video clip", "you look great in this picture", "call me when you get the chance", etc.) to compose a message, such as a response to the received message, wherein the message can be viewed on the display screen of the display component 116, display screen on the STB 114, and/or the display screen on the remote control component 202, and the message can be transmitted from the STB 114 to the UE 102, for example, via the core network 106. As a result, if the subscriber does not like or desire using a computer (e.g., personal computer (PC)) or wireless communication device (e.g., cellular phone), the subscriber can easily use the STB 114 and/or associated remote control component 202 to enjoy text messaging, video sharing, and other messaging options, as, for instance, there are many persons who are much more used to using, and much more comfortable using, a remote control, such as remote control component 202, than a PC or cellular phone.

In still another aspect, as desired, the received message also can be forwarded, manually or automatically, to another communication device (e.g., UE, computer, landline phone, etc.) (not shown in FIG. 1 or 2) by the STB 114. For example, the subscriber may be at a location different than the location of the STB 114, and can program the STB 114 to forward all messages or a desired portion of the received messages (e.g., messages that at least meet a predefined priority threshold level) to another communication device associated with the subscriber, wherein the subscriber can access the forwarded message using the other communication device. As another aspect, the subscriber can receive and/or view the message on the STB 114 or remote control component 202, and can manually enter an instruction to the STB 114, via the STB 114 or remote control component 202, to forward the received message to a desired communication device, and, in response to the forwarding instruction, the STB 114 can forward the received message to the desired communication device for viewing or listening on the desired communication device.

In yet another aspect, the STB 114 can be used to facilitate establishing a real time video share session with, for example, a UE 102 (e.g., UE in a remote location), wherein video content can be shared between the UE 102 and STB 114 (e.g., video content can be communicated from the UE 102 to the STB 114, and/or video content can be communicated from the STB 114 to the UE 102). As desired, the video share session can be recorded by the STB 114 and a copy of the video share session can be stored in the data store 118, wherein the subscriber associated with the STB 114 or other users can view the video share session at a later time by using the STB 114 or remote control component 202 to retrieve the video share session from the data store 118 and displaying the video share session on a desired display screen (e.g., display screen of the display component 116, display screen of the STB 114). An additional benefit to being able to establish the real time video share session between the STB 114 and the UE 102 is that mobile wireless devices, such as UEs, can have limited storage capacity, and using the data store 118 associated with the STB 114 to store video share content from the UE 102 can free up the data store associated with the UE 102 so that the UE's data store can have storage available for recording other information (e.g., text, video content, audio content, etc.).

Figure 3:
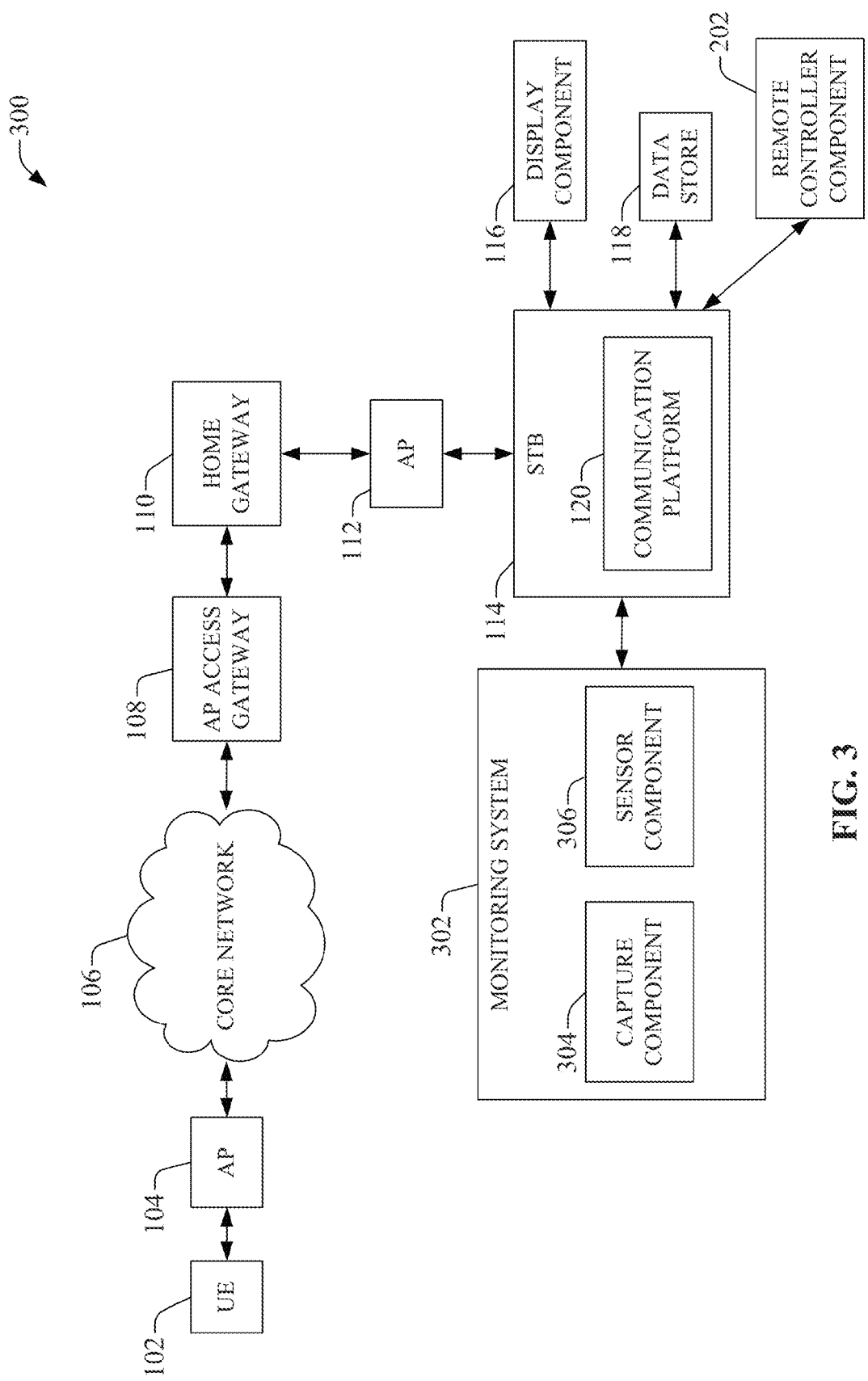
FIG. 3 illustrates a block diagram of an example system that can employ a monitoring system, which can be associated with the STB, to facilitate monitoring conditions associated with a physical location and sending messages related to the monitored conditions in accordance with an embodiment of the disclosed subject matter.

Turning to FIG. 3 (along with FIGS. 1 and 2), illustrated is a block diagram of an example system 300 that can employ a monitoring system, which can be associated with the STB 114, to facilitate monitoring conditions associated with a physical location and sending messages related to the monitored conditions in accordance with an embodiment of the disclosed subject matter. The system 300 can comprise one or more UEs, including UE 102, AP 104, core network 106, AP access gateway 108, home gateway 110, AP 112, STB 114, display component 116, data store 118, communication platform 120, and remote control component 202 that each can comprise the same or similar as, or can comprise the same or similar functionality as, respective components (e.g., respectively named or numbered components) such as more fully described herein, for example, with regard to system 100, system 200, system 400, system 500, etc.

In an aspect, the system 300 can include a monitoring system 302 that can be employed to monitor conditions (e.g., security of, or events occurring in, a room(s) or other area(s)) associated with a physical location (e.g., home, business)), which is associated with the STB 114 (e.g., the STB 114 is located in or is otherwise associated with the physical location). The monitoring system 302 can comprise one or more capture components, such as capture component 304 (e.g., video camera that can capture video and/or audio), that can monitor (e.g., focus on a specified area, scan a specified area) and capture events or conditions occurring in the respective area being monitored by the respective capture component (e.g., 304). The monitoring system 302 also can include one or more sensor components, such as sensor component 306 (e.g., audio sensor, movement sensor, heat sensor, etc.), that can sense (e.g., detect) a change in condition, for example, relating to noise, movement, emanating heat, etc., and in response to sensing such change in condition, the sensor component 306 can send an indicator(s) that can identify one or more characteristics (e.g., change in condition occurred, type of change in condition, location of condition change, etc.) relating to the sensed change in condition to the STB 114. The capture component(s) 304 can be continuously or periodically capturing and recording events, or can be triggered to capture and record events in response to a sensed change in condition by the sensor component(s) 306. A capture component(s) 304 can be used to capture events relating to the sensed change in condition and the captured events can be recorded and stored in the data store 118 associated with the STB 114. In accordance with predefined notification criteria, the STB 114 can send a notification message or alert indicator and/or associated video content (e.g., with or without associated audio content) to a desired UE 102, via, for example, the core network 106, to notify the subscriber of the sensed change in condition, and the UE 102 can be used to view or otherwise perceive the notification message or alert indicator and/or associated video content. As desired, the STB 114 can be used as a primary or auxiliary device to access monitored conditions as captured by the one or more capture components 304, as, for instance, the monitoring system 302 can provide another access component that can be used to store and access monitored conditions, wherein this access component can be the primary or auxiliary device used for accessing monitored conditions.

Figure 4:
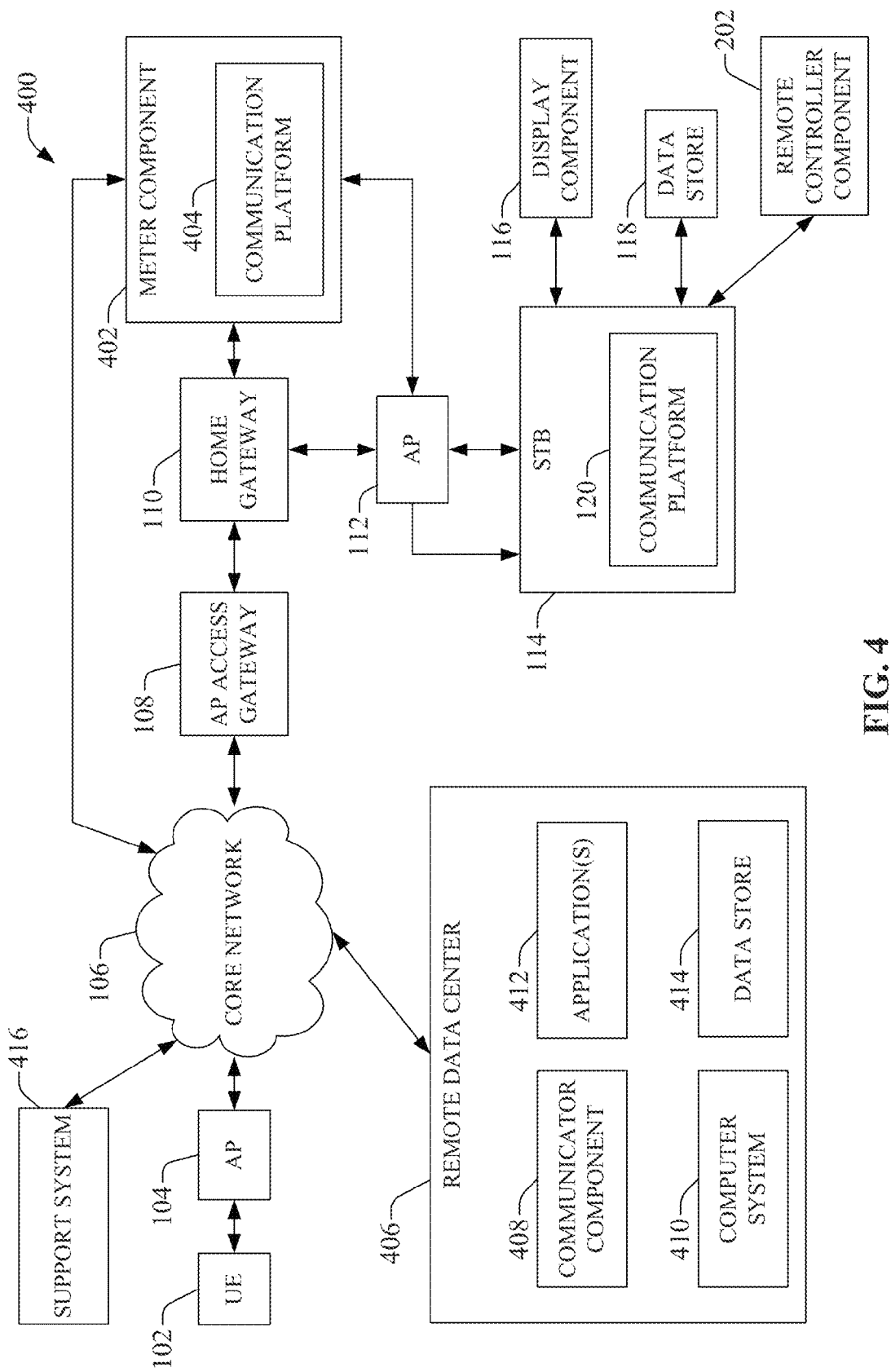
FIG. 4 depicts a block diagram of an example system that can facilitate data communication between a meter component (e.g., smart meter) and a remote data center associated with a utility or service provider via at least the STB in accordance with an embodiment of the disclosed subject matter.

Referring to FIG. 4 (along with FIGS. 1 and 2), depicted is a block diagram of an example system 400 that can facilitate data communication between a meter component (e.g., smart meter) and a remote data center associated with a utility or service provider via at least the STB 114 in accordance with an embodiment of the disclosed subject matter. The system 400 can comprise one or more UEs, including UE 102, AP 104, core network 106, AP access gateway 108, home gateway 110, AP 112, STB 114, display component 116, data store 118, communication platform 120, and remote control component 202 that each can comprise the same or similar as, or can comprise the same or similar functionality as, respective components (e.g., respectively named or numbered components) such as more fully described herein, for example, with regard to system 100, system 200, and system 300.

In an aspect, the system 400 can include a meter component 402 (e.g., a smart meter) that can be employed to monitor and identify amount of consumption of a product and/or utility, such as electricity, gas, water, etc. The meter component 402 can be used to perform meter readings periodically (e.g., once per month) or when desired, wherein a meter reading can identify a current amount of usage of the product or utility. The meter component 402 can include a communication platform 404 that can facilitate M2M communications with other communication devices in the communication network environment. The communication platform 404 can facilitate communication of information (e.g., meter readings, emergency messages regarding utility or service, etc.) via a desired communication connection, which can be a wireline connection (e.g., Ethernet connection) or a wireless connection (e.g., via a femtocell or picocell, Wi-Fi, Wi-Max, Bluetooth, etc.), to the STB 114 and/or a remote data center 406, which can be associated with the utility company or other service provider associated with the product or utility being monitored by the meter component 402. For example, the meter component 402 can communicate information wirelessly to the remote data center 406 via the core network 106 and a macro AP (not shown) and/or to the STB 114 via a wireline connection with the home gateway 110 or a wireless connection via the AP 112.

In another aspect, the AP 112 can comprise a local traffic breakout function that can enable the AP 112 to establish communication sessions between communication devices, such as the STB 114, meter component 402, or UEs, connected to the AP 112 without using a VPN tunnel route to the core network 106. The local traffic breakout function of the AP 112 can facilitate establishing a communication connection (e.g., local communication connection) between the meter component 402 and STB 114 via the AP 112. In accordance with various embodiments, the AP 112 can allow communication devices (e.g., UEs, STB, meter component, etc.), which desire to connect to the AP 112, to connect to the AP 112 and communicate voice and data; or, optionally, the AP access gateway 108 and/or AP 112 can have or be associated with a white list of communication device identifiers (e.g., Mobile Subscriber ISDN Numbers (MISDNs)) for communication devices that can connect with the AP 112 to communicate voice and data to facilitate controlling access to the AP 112 to those communication devices desired by the user owning, controlling, or operating the AP 112. The respective communication device identifiers of the meter component 402 and STB 114 can be included in white list associated with the AP 112, and the white list can be used to enable call or communication administration for the meter component 402, for example, with regard to communications by the meter component 402 with the STB 114. The white list can be stored by the AP access gateway 108 and a copy of the white list also can be downloaded to and/or stored in the AP 112.

In yet another aspect, the meter component 402 also can monitor a specified area to identify and locate an available wireless communication connection (e.g., Wi-Fi connection, Bluetooth connection, etc.) and the meter component 402 can establish a wireless communication connection with the available wireless communication device, such as the home gateway 110 or another home gateway (not shown) when desired and/or allowed (e.g., when the utility or service provider, associated with the meter component 402, allows connection with a secondary home gateway as a back-up choice).

In still another aspect, the STB 114 can receive information relating to the meter reading and/or historical information related to meter readings from the meter component 402, and the information and/or historical information can be stored in the data store 118 and/or displayed on the display screen on the display component 116, display screen on the STB 114, or other desired display screen (e.g., home monitoring device for monitoring utility usage, computer screen, cellular phone display screen). The subscriber can use a desired interface (e.g., keypad, keyboard, etc.) on the STB 114 or the remote control component 202 to retrieve the information from the data store 118 or display the information on the desired display screen. The subscriber can view the information relating to the meter reading and/or historical information on the desired display screen to ensure the accuracy of the meter reading.

In addition to providing the subscriber the information relating to the meter reading, the subscriber can be provided a number of selections, such as a valid selection or indicator, which can be used or selected by the subscriber to indicate that the meter reading is valid, or an invalid or dispute selection or indicator, which can be used or selected by the subscriber to indicate that the meter is reading is disputed (e.g., incorrect amount of utility usage, incorrect monetary amount billed, etc.) by the subscriber. As desired, there also can be a supplemental information area, wherein the subscriber can enter additional information, such as detailed information as to why the meter reading is disputed by the subscriber, for example. The selection or indicator, if any, by the subscriber and supplemental information, if any, provided by the subscriber can be stored with the meter reading-related information in the data store 118 and/or can be transmitted from the STB 114 to the remote data center 406 via the desired communication path (e.g., wireline connection (e.g., Ethernet connection) or wireless connection (e.g., via femtocell, Wi-Fi, etc.) with the home gateway 110 to a wireline or wireless connection with the remote data center 406). As desired, the subscriber will not be able to change the information (e.g., amount of utility usage, amount charged for such usage, etc.) in the meter reading, although the subscriber can be permitted to enter supplemental information regarding what the subscriber believes to be the correct meter reading values. A copy or version of the meter reading that includes the selected indicator and/or supplemental information provided by the subscriber can be saved in the data store 118 and/or communicated to the remote data center 406.

In yet another aspect, if the meter component 402 only has a communication connection with the core network 106 available for communicating information to the remote data center 406, the meter component 402 can be configured to communicate the information to the remote data center 406 via the AP 112 (when so equipped). If the AP 112 is not available to the meter component 402 for communication information to the remote data center 406, the meter component 402 can communicate the information to the remote data center 406 via a macrocell communication connection (not shown in FIG. 1, 2, or 4).

In an aspect, the remote data center 406 can include a communicator component 408 that establish a communication connection (e.g., wireless connection) with the core network 106, the Internet (not shown in FIG. 4) via a wireline or wireless connection, or other desired wireline or wireless communication connection(s) to facilitate communications between the remote data center 406 and the STB 114, and remote data center 406 and the meter component 402. In another aspect, the remote data center 406 also can comprise one or more computer systems, such as computer system 410, that can employ one or more processors (not shown) and one or more applications, such as a reader application 412 (e.g., remote meter reading application(s)), wherein the reader application 412 can receive and analyze respective information relating to utility or service consumption of respective customers to facilitate identifying or determining respective amounts of consumption of the utility or service by respective customers and generate corresponding billings for the customers. Based at least in part on the received information and predefined billing criteria, the reader application(s) 412 can identify or determine a monetary amount a customer is to be charged for consumption of the utility or service by the customer, and can generate a billing that corresponds to the consumption by the customer. The received information and billing information of customers can be stored in a data store 414. A billing for the utility or service can be provided to a customer by sending the billing to the email of the customer, making the billing available to the customer on a web site associated with the utility or service provider, sending the billing to the STB 114 of the customer, sending by regular mail to the customer, or other desired type of communication to the customer, as desired.

In an embodiment, the core network 106 can be associated with a support system 416 (e.g., Operation Support System (OSS), Business Support System (BSS)) that can be employed to monitor conditions relating to communications between the STB 114 and meter component 402, and can detect or be notified when a problem arises with communications between the STB 114 and meter component 402. In an aspect, the support system 416 also can communicate with the STB 114 and meter component 402 via an Internet connection (not shown in FIG. 4), as desired, to facilitate performing all or some of the support functions disclosed herein. The support system 416 can analyze communication conditions associated with the STB 114 and meter component 402, can diagnose communication problems associated with the STB 114 and meter component 402, and can identify or determine a solution (e.g., a particular re-configuration of communication parameters on the STB 114 or meter component 402) that can be used to resolve the communication problems. In another aspect, the support system 416 can enable pre-provisioning or re-configuring communication platform 120 of the STB 114 and/or the communication platform 404 of the meter component 402 to facilitate enabling, establishing, or re-establishing communications between the STB 114 and the meter component 402.

Figure 5:
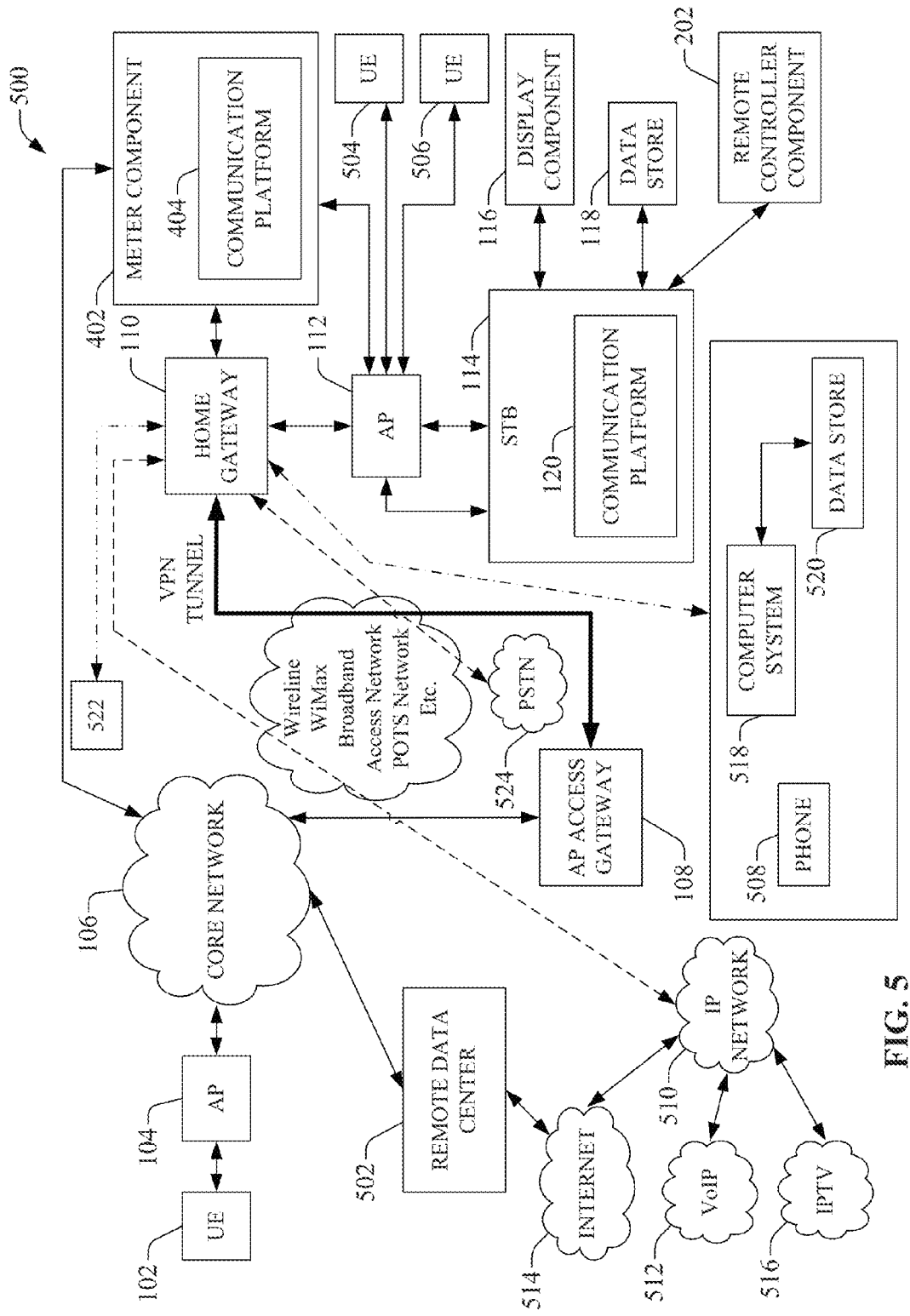
FIG. 5 illustrates a block diagram of an example system that can facilitate communication of messages (e.g., text messages, video content, audio content, etc.) associated with an STB in accordance with an embodiment of the disclosed subject matter.

FIG. 5 illustrates a diagram of an example system 500 that can facilitate communication of messages (e.g., text messages, video content, audio content, etc.) associated with an STB in accordance with an embodiment of the disclosed subject matter. The system 500 can include comprise one or more UEs, including UE 102, AP 104, core network 106, AP access gateway 108, home gateway 110, AP 112, STB 114, display component 116, data store 118, communication platform 120, remote control component 202, meter component 402, communication platform 404, and remote data center 502 that each can comprise the same or similar as, or can comprise the same or similar functionality as, respective components (e.g., respectively named or numbered components) such as more fully described herein, for example, with regard to system 100, system 200, system 300, and system 400, etc.

In accordance with an embodiment, the system 500 also can comprise UE 504, which can be a mobile communication device, such as a cellular phone, and UE 506, which can be a laptop computer that includes a SIM card, for example. The UEs 504 and 506 can wirelessly connect with the AP 112 (e.g., femtocell, picocell, etc.) to communicate with other communication devices (e.g., UE 102) associated with the communication network environment. The system 500 also can contain a phone 508 (e.g., VoIP phone) that can be can be connected to the home gateway 110 via a wireline connection and can be used for voice calls using VoIP or other data communications to other communication devices. The home gateway 110 can be associated with (e.g., connected to) an IP network 510 that can provide desired Internet-related services, including high speed Internet services. For instance, the IP network 510 can be associated with VoIP services 512 that can provide VoIP services to VoIP-capable communication devices including phone 508, the Internet 514 that can be used to access information, utilize or provide services, and/or communicate with other communication devices (e.g., computers, phones, etc.), etc., and IPTV services 516 that can provide television programming, music, etc., to display components (e.g., IPTVs), including display component 116, of subscribers for viewing and listening. In an aspect, the remote data center 502 can be associated with the Internet 514. As desired, the meter component 402 (for example, located in an outside region or other desired region of the home or business of the subscriber) can communicate with the remote data center 502 via the home gateway 110 and Internet 514, or via the core network 106.

The system 500 also can include computer system 518 that can be connected (e.g., via wireline or wireless connection) to the home gateway 110. The computer system 518 can be used to access the Internet 514, for example. If desired, meter reading-related information can be communicated to the computer system 518 by the meter component 402, STB 114, and/or remote data center 502, where the subscriber can review the meter reading-related information for accuracy, and can use a valid indicator to indicate that a meter reading is valid or a dispute indicator to dispute or indicate there is an error with a meter reading. The computer system 518 can communicate the meter reading, the indicator (if any) selected by the subscriber, and/or other related information to the remote data center 502. The computer system 518 also can include or be associated with a data store 520 that can be used to store data, such as meter reading-related information, for access and retrieval, when desired.

The system 500 also can include a phone 522 (e.g., regular landline phone) that can be connected to the home gateway 110, which can be connected to a Public Switched Telephone Network (PSTN) 524 to facilitate communication by the phone 522 with other communication devices in the communication network environment. For instance, POTS traffic can be communicated between the phone 522 and PSTN 524 and between the PSTN 524 and other communication devices associated with the communication network environment.

The subject specification has a number of advantages over conventional communication systems and methods. For instance, the subject specification, by introducing converged wireline and wireless features, can allow service providers to offer a differentiated service offering, which can provide improved service opportunities and revenue generation for service providers, as compared to the service opportunities and revenue generation available to service providers with conventional communication systems and methods. The subject specification also improves the use of meter components, such as smart meters, by allowing alternative ways to communicate with a remote system in a remote data center of a utility or service provider and improves the QoS of the meter reading operation of the utility or service provider, as compared to conventional systems and methods. The subject specification, by allowing local copies of the meter readings to be communicated to the STB and stored in the associated data store, where the copy of the meter reading can be reviewed and verified for accuracy by the subscriber and disputed if thought to be inaccurate, can increase accuracy of meter readings and customer satisfaction for the utility or service provider, as compared to conventional systems and methods. The subject specification, by allowing communications, including messaging and video share between the STB and communication devices (e.g., UEs), can improve service opportunities for service providers and increase customer satisfaction, as compared to conventional systems and methods.

In accordance with an embodiment of the disclosed subject matter, one or more components (e.g., STB 114, meter component 402, support system 416, etc.) in the communication network environment can utilize artificial intelligence (AI) techniques or methods to infer (e.g., reason and draw a conclusion based at least in part on a set of metrics, arguments, or known outcomes in controlled scenarios) whether a communication path is available for communications between the STB and meter component, or the meter component and the remote data center, etc., and which communication path of the available communication paths will offer the best communication conditions; a diagnosis of a communication problem with communications between the STB and the meter component; a solution to solve a communication problem between the STB and the meter component; etc. Artificial intelligence techniques typically can apply advanced mathematical algorithms—e.g., decision trees, neural networks, regression analysis, principal component analysis (PCA) for feature and pattern extraction, cluster analysis, genetic algorithm, and reinforced learning—to historic and/or current data associated with the systems and methods disclosed herein to facilitate rendering an inference(s) related to the systems and methods disclosed herein.

In particular, the one or more components in the communication network environment can employ one of numerous methods for learning from data and then drawing inferences from the models so constructed, e.g., Hidden Markov Models (HMMs) and related prototypical dependency models. General probabilistic graphical models, such as Dempster-Shafer networks and Bayesian networks like those created by structure search using a Bayesian model score or approximation can also be utilized. In addition, linear classifiers, such as support vector machines (SVMs), non-linear classifiers like methods referred to as "neural network" methods, fuzzy logic methods can also be employed. Moreover, game theoretic models (e.g., game trees, game matrices, pure and mixed strategies, utility algorithms, Nash equilibria, evolutionary game theory, etc.) and other approaches that perform data fusion, etc., can be exploited in accordance with implementing various automated aspects described herein. The foregoing methods can be applied to analysis of the historic and/or current data associated with systems and methods disclosed herein to facilitate making inferences or determinations related to systems and methods disclosed herein.

In accordance with various aspects and embodiments, the subject specification can be utilized in wireless and/or wired communication networks. For example, the disclosed subject matter can be employed in wireless networks, with such networks including, for example, 2G type networks, 3G type networks, 4G type networks, LTE, Universal Mobile Telecommunications Systems (UMTS), Code Division Multiple Access (CDMA) type systems, Wideband CDMA (WCDMA) type systems, etc.

Figure 6:
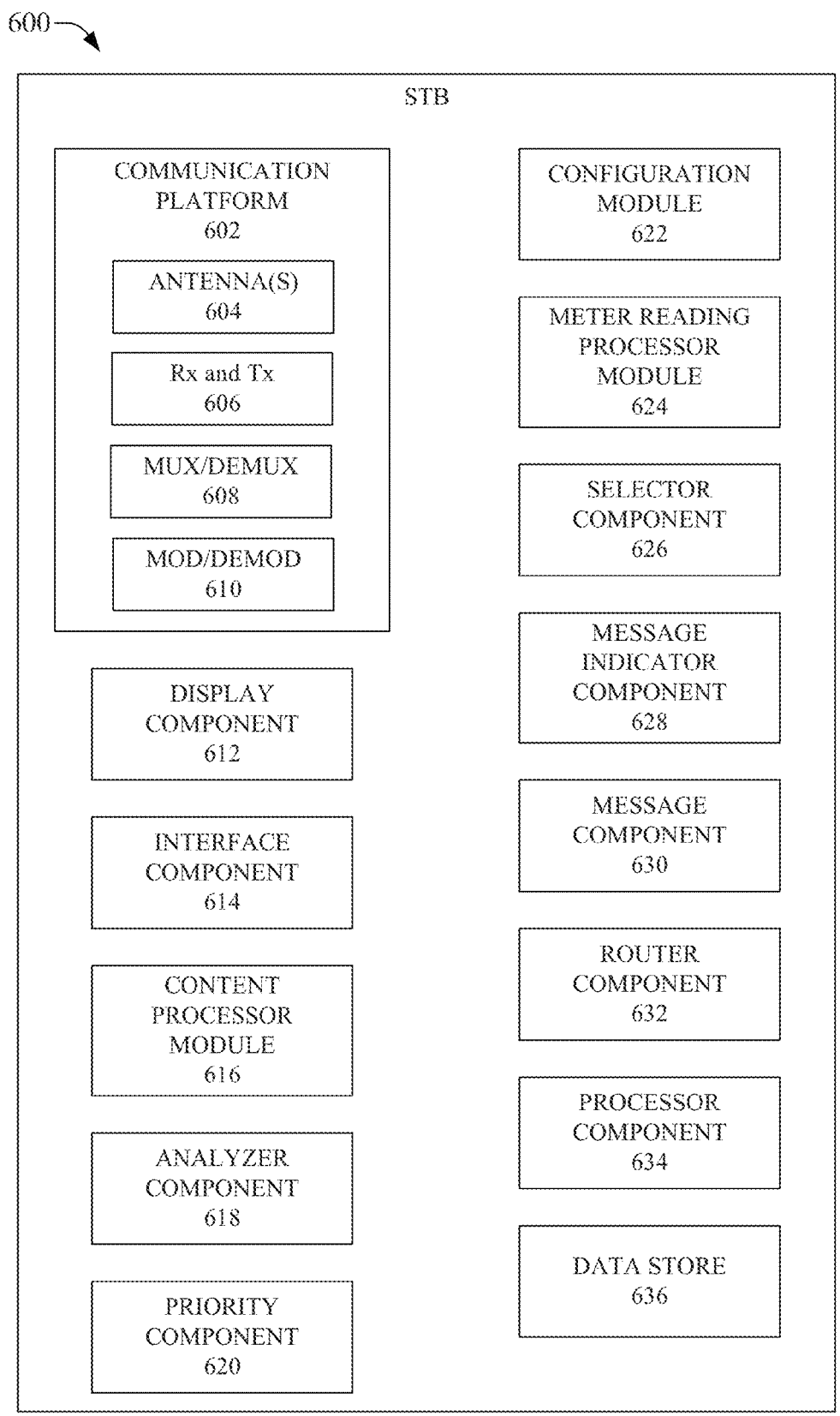
FIG. 6 depicts a block diagram of an example STB in accordance with various embodiments of the disclosed subject matter.

FIG. 6 depicts a block diagram of an example STB 600 in accordance with various embodiments of the disclosed subject matter. In an aspect, the STB 600 can comprise a communication platform 602 (e.g., comprising M2M interface module) that can be employed to communicate via a wireline or wireless connection with other communication devices, including, for example UEs and meter components. For example, the communication platform 602 can comprise an M2M chipset and one or more applications (e.g., software applications) that can allow the STB 600 to communicate with other communication devices (e.g., meter component, 2G/3G/4G/LTE communication devices) via a wireless communication connection with a macrocell or a microcell, such as a femtocell or picocell.

The communication platform 602 can comprise one or more antennas 604 that can receive and transmit signal(s) from and to wireless communication devices like APs, access terminals, a meter component, wireless ports and routers, and so forth, that operate in a radio access network. The communication platform 602 also can include electronic components and associated circuitry that provide for processing and manipulation of received signal(s) and signal(s) to be transmitted, e.g., receivers and transmitters (Rx and Tx) 606, multiplexer/demultiplexer (mux/demux) component 608, and modulation/demodulation (mod/demod) component 610.

In an embodiment, the STB 600 optionally can contain a display component 612 that can be used to display information, including received messages (e.g., text messages, video content, etc.) and information input to the STB 600, for example, by a subscriber. The STB 600 can include an interface component 614 that can comprise one or more interfaces (e.g., keypad, QWERTY keyboard, touch screen display, audio speakers or drivers, vibration emitter, etc.) that can be used to communicate information to the subscriber or other users or receive information from the subscriber or other users. The STB 600 also can include an content processor module 616 that can allow content (e.g., text, video content, audio content, etc.) to be delivered to the communication platform 602 so that the content can be communicated to a desired communication device, or can allow content to be received from the communication platform 602 to facilitate presentation of the received content to the subscriber or other users. The content processor module 616 can process the content, as desired, for different available display screens, or portions thereof, based at least in part on the particular display screen(s) that the content is to be displayed. For example, content can be processed for optimal display on an IPTV when the content is to be displayed on the display screen of the IPTV, and processed differently for optimal display on the display screen of the display component 612 when the content is to be displayed on the display screen of the display component 612.

The STB 600 also can comprise an analyzer component 618 that can analyze or evaluate information, such as received messages, and associated metadata, to facilitate identifying a priority level of respective portions of information (e.g., respective messages) to determine the order of presentation of information to the subscriber or other users, wherein information that has a higher priority level (e.g., emergency warning, weather warning, urgent message from a relative of the subscriber, etc.) can be presented (e.g., displayed) to the subscriber or others before information having a relatively lower priority level (e.g., ordinary video or images, ordinary text messages, etc.) in accordance with the predefined presentation criteria. The analyzer component 618 can operate in conjunction with a priority component 620 to facilitate identifying and assigning priority levels to respective portions of information received. The priority component 620 also can operate in conjunction with the content processor module 616 to facilitate arranging and providing respective portions of information in the desired priority order for presentation in accordance with respective priority levels of the portions of information.

In another aspect, the STB 600 can contain a configuration module 622 that can be employed to allow a service provider to pre-provision or re-provision a preference regarding communication path (e.g., M2M communication path) for the STB 600. For example, the configuration module 622 can pre-provision the communication path preference of the STB 600 so that the communication path is via the subscriber's femtocell, and when the femtocell is not available, the communication platform 602 can use a macrocell connection. In still another aspect, the configuration module 622 can maintain and provide a list of hot numbers, which can allow a user of the STB 600 (directly or using the associated remote control component) to initiate and send a text message, video share session, or other desired communication with/to a remote user's UE by selection of the remote user's UE in the hot number list. The STB 600 can receive information relating to the hot numbers via the interface component 614 to facilitate creating, editing, and maintaining the list of hot numbers or selecting a hot number from the list.

The STB 600 also can comprise a meter reading processor module 624 that can process meter readings and other related information received from, for example, the meter component associated with the subscriber. The meter reading processor module 624 also can facilitate storing and retrieving the meter readings and related information in/from a data store (e.g., DVR) that can be associated with the STB 600. In another aspect, the meter reading processor module 624 can receive an indicator, such as a valid or verified indicator or a dispute or invalid indicator, and/or related information (e.g., detailed information regarding a dispute of a meter reading) and can associate the indicator and/or related information with the meter reading, where the indicator and/or related information can be contained in a modified copy of the meter reading, which can be stored in the data store associated with the STB 600 and/or communicated to the remote data center. In still another aspect, the meter reading processor module 624 can map meter reading and/or related information to a dedicated channel or a dedication portion of a display screen on the display component (e.g., IPTV) associated with the STB 600 or the display component 612 of the STB 600 to allow subscribers a number of different ways to view the meter reading and/or related information.

The STB 600 also can contain a selector component 626 that can be employed for presenting available selections (e.g., valid or verified indicator, dispute or invalid indicator) to the subscriber in relation to meter readings and can receive information, for example, via the interface component 614, indicating the selected indicator from the subscriber. In another aspect, the selector component 626 also can present available selections of pre-configured text that can be selected by the subscriber to quickly and easily compose and send a message to another communication device, wherein the subscriber can use the interface component 614 to facilitate selecting a desired selection of pre-configured text.

In yet another aspect, the STB 600 can include a message indicator component 628 that can facilitate providing a desired indicator to a subscriber that there is a message received or available for viewing, wherein the STB 600 can facilitate providing the indicator one the STB 600 itself, an associated display component, an associated remote control component, and/or a remote communication device. The indicator can be a visual indicator (e.g., displayed icon or flashing icon on the display screen of the STB 600, display screen of the IPTV, display screen or Light Emitting Diode (LED) on the remote control component), audio indicator (e.g., beep or other noise or spoken message) that can be presented by a speaker or driver on the interface component 614, the IPTV speaker or associated stereo system, or a speaker or driver on the remote control component, and/or another sensory indicator, such as a vibration indicator, wherein, for example, the message indicator component 628 can send a signal to the remote control component to have the remote control component vibrate to indicate that a message has been received or is available for viewing by the subscriber.

In an aspect, the STB 600 can comprise a message component 630 that can be used to receive information to facilitate composing and processing messages, such as messages (e.g., text message, video content, audio content, etc.) the subscriber desires to communicate to or video share sessions the subscriber desires to establish with other communication device users. The message component 630 can operate in conjunction with the selector component 626 to present available selections of pre-configured text to the subscriber for selection, as desired by the subscriber.

The STB 600 also can contain a router component 632 that can employed to facilitate routing messages to a desired display screen (e.g., display screen on the STB 600, display screen on the IPTV, display screen on the remote control component). The router component 632 also can be employed to facilitate routing or forwarding a message from the STB 600 to another desired communication device, such as a mobile phone, a computer, etc., as desired by the subscriber.

In yet another aspect, the STB 600 can comprise a processor component 634 that can work in conjunction with the other components (e.g., communication platform 602, (optional) display component 612, interface component 614, content processor module 616, analyzer component 618, priority component 620, configuration module 622, meter reading processor module 624, selector component 626, message indicator component 628, message component 630, router component 632, etc.) to facilitate performing the various functions of the STB 600. The processor component 634 can employ one or more processors, microprocessors, or controllers that can process data, such as information relating to received or composed messages, meter readings from the meter component, information relating to other communications (e.g., TV content, communications related to the Internet, etc.) with other communication devices, information relating to operations of the STB 600, and/or other information, etc., to facilitate operation of the STB 600, messaging associated with the STB 600, and processing of meter readings associated with the meter component; and can control data flow between the STB 600 and other components (e.g., UE, display component (e.g., IPTV), remote control component, meter component, remote data center, etc.) associated with the STB 600.

The STB 600 also can include a data store 636 that can store data structures (e.g., user data, metadata); code structure(s) (e.g., modules, objects, classes, procedures) or instructions; information relating to received or composed messages, meter readings from the meter component, information relating to other communications (e.g., TV content, communications related to the Internet, etc.) with other communication devices, information relating to operations of the STB 600, predefined presentation criteria (and associated predefined presentation rules), predefined message routing rules, preconfigured text messages, etc., to facilitate controlling operations associated with the STB 600, etc. In an aspect, the processor component 634 can be functionally coupled (e.g., through a memory bus) to the data store 636 in order to store and retrieve information desired to operate and/or confer functionality, at least in part, to the communication platform 602, (optional) display component 612, interface component 614, content processor module 616, analyzer component 618, priority component 620, configuration module 622, meter reading processor module 624, selector component 626, message indicator component 628, message component 630, router component 632, and/or substantially any other operational aspects of the STB 600.

Figure 7:
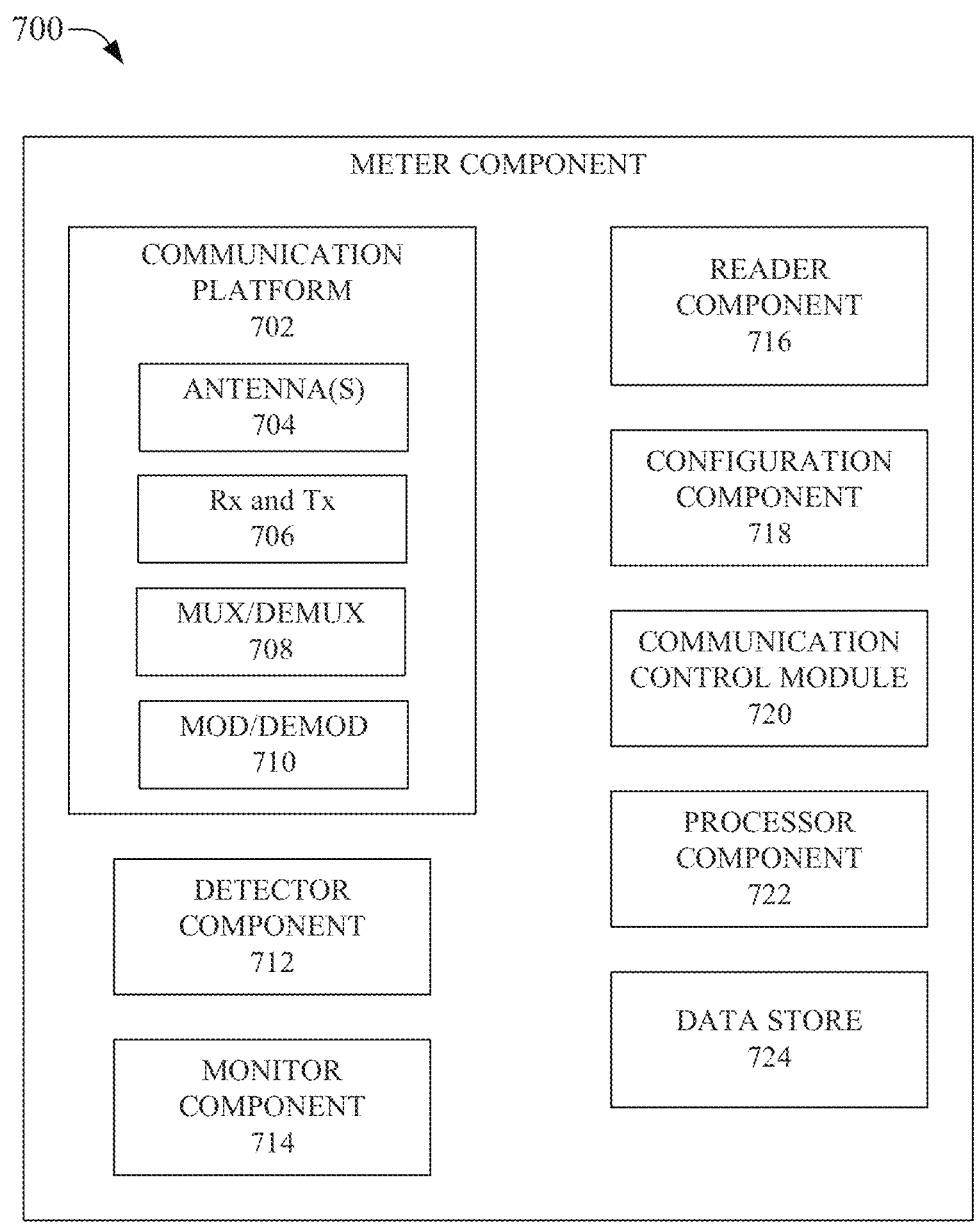
FIG. 7 illustrates a block diagram of an example meter component in accordance with an embodiment of the disclosed subject matter.

FIG. 7 illustrates a block diagram of an example meter component 700 in accordance with an embodiment of the disclosed subject matter. In an aspect, the meter component 700 can include a communication platform 702 (e.g., M2M interface module) that can be employed to communicate via a wireline (e.g., Ethernet) or wireless connection with other communication devices, including, for example an STB. For example, the communication platform 702 can comprise an M2M chipset and one or more applications (e.g., software applications) that can allow the meter component 700 to communicate with other communication devices (e.g., home gateway, STB, computer or other communication device associated with the remote data center) via a macrocell or a microcell, such as a femtocell or picocell, or via a Wi-Fi connection.

The communication platform 702 can comprise one or more antennas 704 that can receive and transmit signal(s) from and to wireless communication devices like APs, access terminals, an STB, wireless ports and routers, and so forth, that operate in a radio access network. The communication platform 702 also can include electronic components and associated circuitry that provide for processing and manipulation of received signal(s) and signal(s) to be transmitted, e.g., receivers (Rx) and transmitters (Tx) 706, multiplexer/demultiplexer (mux/demux) component 708, and modulation/demodulation (mod/demod) component 710.

The meter component 700 (optionally) can include a detector component 712 that can scan or monitor a predefined area around the meter component 700 to facilitate detecting or locating a communication device with which a wireless connection can be established. The detector component 712 can detect a Wi-Fi communication interface or other type of wireless communication interface (e.g., Bluetooth), for example, associated with a home gateway of the subscriber or a neighboring home gateway. The communication platform 702 and detector component 712 can operate in conjunction with each other to facilitate establishing a wireless communication connection between the meter component 700 and the subscriber's home gateway, or, if permitted by the utility or service provider, a neighboring home gateway as a back-up option when a connection is not able to be established with the subscriber's home gateway.

The meter component 700 also can contain a monitor component 714 that can monitor consumption of materials, products, or services (e.g., electricity, gas, water, etc.) provided by an utility or a service provider to facilitate tracking usage of the materials, products, or services by a subscriber. The meter component 700 also can include a reader component 716 that can identify or measure an amount of consumption of the materials, products, or services, as desired (e.g., periodically, or when requested) and can generate a meter reading that can specify the amount of consumption of the materials, products, or services for a specified period of time (e.g., over the time since the last periodic reading, over the time since the last reading). The reader component 716 also can provide historical consumption reports that can show usage over a desired period of time (e.g., last twelve months). The meter reading report, historical consumption report, and/or other related information can be provided to the STB of the subscriber for viewing and/or verification, and/or to the remote data center of the utility or service provider, via a desired communication connection.

In another aspect, the meter component 700 can employ a configuration module 718 that can facilitate pre-provisioning of the subscriber's home gateway and associated encrypted authentication passcodes for mutual authentication of the meter component 700 and the home gateway to facilitate communication between the meter component 700 and home gateway. The configuration module 718 also can facilitate establishing or allowing a microcell (e.g., femtocell, picocell) communication path in addition to a macrocell communication path to facilitate communication with a remote host system. In yet another aspect, the configuration module 718 can facilitate multi-cast communications to more than one communication device via one or more types of communication connections or paths, and can define which communication device(s) are to be sent meter readings and/or related information at a given time.

In still another aspect, the meter component 700 can include a communication control module 720 that can access or reference the configuration module 716 to facilitate identifying a preferred communication connection or path (e.g., Wi-Fi, cellular (e.g., macrocellular, microcellular), Ethernet, etc.) to communicate information to the remote data center or STB based at least in part on preferences indicated by the configuration module 718 and the current availability of respective communication connections or paths.

In yet another aspect, the meter component 700 can comprise a processor component 722 that can work in conjunction with the other components (e.g., communication platform 702, detector component 712, monitor component 714, reader component 716, configuration module 718, communication control module 720, etc.) to facilitate performing the various functions of the meter component 700. The processor component 722 can employ one or more processors, microprocessors, or controllers that can process data, such as information relating to monitoring or tracking (e.g., measuring) consumption of materials, products, or services, information relating to meter readings, information relating to identifying and establishing a desired communication connection with another communication device, information relating to operations of the meter component 700, and/or other information, etc., to facilitate operation of the meter component 700, and processing of meter readings associated with the meter component 700; and can control data flow between the meter component 700 and other components (e.g., home gateway, STB, remote data center, home PC, etc.) associated with the meter component 700.

The meter component 700 also can include a data store 724 that can store data structures (e.g., user data, metadata); code structure(s) (e.g., modules, objects, classes, procedures) or instructions; information relating to monitoring or tracking (e.g., measuring) consumption of materials, products, or services, information relating to meter readings, information relating to identifying and establishing a desired communication connection with another communication device, information relating to operations of the meter component 700, etc., to facilitate controlling operations associated with the meter component 700. In an aspect, the processor component 722 can be functionally coupled (e.g., through a memory bus) to the data store 724 in order to store and retrieve information desired to operate and/or confer functionality, at least in part, to the communication platform 702, detector component 712, monitor component 714, reader component 716, configuration module 718, communication control module 720, and/or substantially any other operational aspects of the meter component 700.

Figure 8:
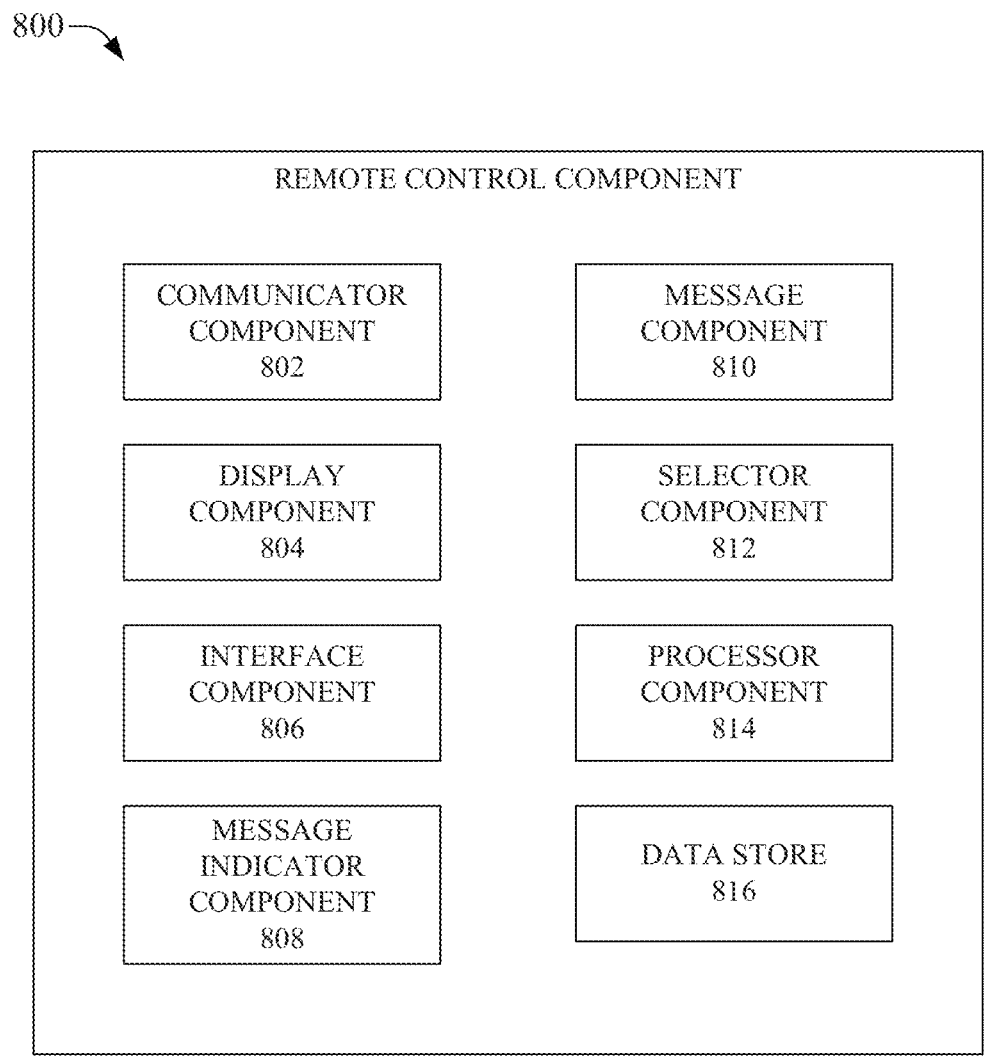
FIG. 8 depicts a block diagram of an example remote control component in accordance with various embodiments of the disclosed subject matter.

FIG. 8 depicts a block diagram of an example remote control component 800 in accordance with various embodiments of the disclosed subject matter. In one embodiment, the remote control component 800 can be a two-way remote control unit that can transmit data to or receive data from an associated STB. In an aspect, the remote control component 800 can include a communicator component 802 that can be employed to communicate (e.g., transmit or receive information) via a wireless connection (e.g., employing an antenna(s), receiver, transmitter, etc. (not shown)) or wireline connection with the STB. The information can relate to TV or music channel selections, text messages, video content, audio content, message indicators, meter readings, etc.

In another aspect, the remote control component 800 optionally can contain a display component 804 that can be a display screen (e.g., LCD, touch screen, etc.) that can be used to display information, including information (e.g., messages, meter reading information, etc.) received from the STB or other communication devices (e.g., UEs, meter component, etc.) via the STB or information entered by a subscriber into the remote control component 800 to communicate with the STB or other communication devices, wherein the information or a portion thereof can be displayed on the display screen of the display component 804.

The remote control component 800 also can include an interface component 806 that can comprise one or more interfaces (e.g., keypad, QWERTY keyboard, touch screen display, audio speakers or drivers, vibration emitter, etc.) that can be used to communicate information to the subscriber or other users or receive information from the subscriber or other users. In still another aspect, the remote control component 800 can include a message indicator component 808 that can facilitate providing a desired indicator to a subscriber that there is a message received or available for viewing. The indicator can be a visual indicator (e.g., displayed icon or flashing icon on the display screen of the display component 804, LED on the remote control component 800, display screen of the IPTV, etc.), audio indicator (e.g., beep or other noise or spoken message) that can be presented by a speaker or driver on the interface component 806 and/or the IPTV speaker or associated stereo system, and/or another sensory indicator, such as a vibration indicator, wherein the message indicator component 808 can employ a vibration emitter to cause the remote control component 800 to vibrate to indicate that a message has been received or is available for viewing by the subscriber.

In yet another aspect, the remote control component 800 can comprise a message component 810 that can be used to receive information to facilitate composing messages, such as messages (e.g., text message, video content, audio content, etc.) the subscriber desires to communicate to, or video share sessions the subscriber desires to establish with, other communication devices of other users. The message component 810 can operate in conjunction with a selector component 812 to present available selections of pre-configured text to the subscriber for selection, as desired by the subscriber, to facilitate easy composition of a desired message.

In yet another aspect, the remote control component 800 can comprise a processor component 814 that can work in conjunction with the other components (e.g., communicator component 802, (optional) display component 804, interface component 806, message indicator component 808, message component 810, selector component 812, etc.) to facilitate performing the various functions of the remote control component 800. The processor component 814 can employ one or more processors, microprocessors, or controllers that can process data, such as information relating to received or composed messages, meter readings from the meter component, information relating to other communications (e.g., TV content, communications related to the Internet, etc.) with other communication devices, information relating to operations of remote control component 800, and/or other information, etc., to facilitate operation of the remote control component 800, messaging associated with the remote control component 800, and processing of meter readings associated with the meter component; and can control data flow between the remote control component 800 and other components (e.g., UE, STB, display component (e.g., IPTV), meter component, remote data center, etc.) associated with the remote control component 800.

The remote control component 800 also can include a data store 816 that can store data structures (e.g., user data, metadata); code structure(s) (e.g., modules, objects, classes, procedures) or instructions; information relating to received or composed messages, meter readings from the meter component, information relating to other communications (e.g., TV content, communications related to the Internet, etc.) with other communication devices, information relating to operations of the remote control component 800, preconfigured text messages, etc., to facilitate controlling operations associated with the remote control component 800, etc. In an aspect, the processor component 814 can be functionally coupled (e.g., through a memory bus) to the data store 816 in order to store and retrieve information desired to operate and/or confer functionality, at least in part, to the communicator component 802, (optional) display component 804, interface component 806, message indicator component 808, message component 810, selector component 812, and/or substantially any other operational aspects of the remote control component 800.

Figure 9:
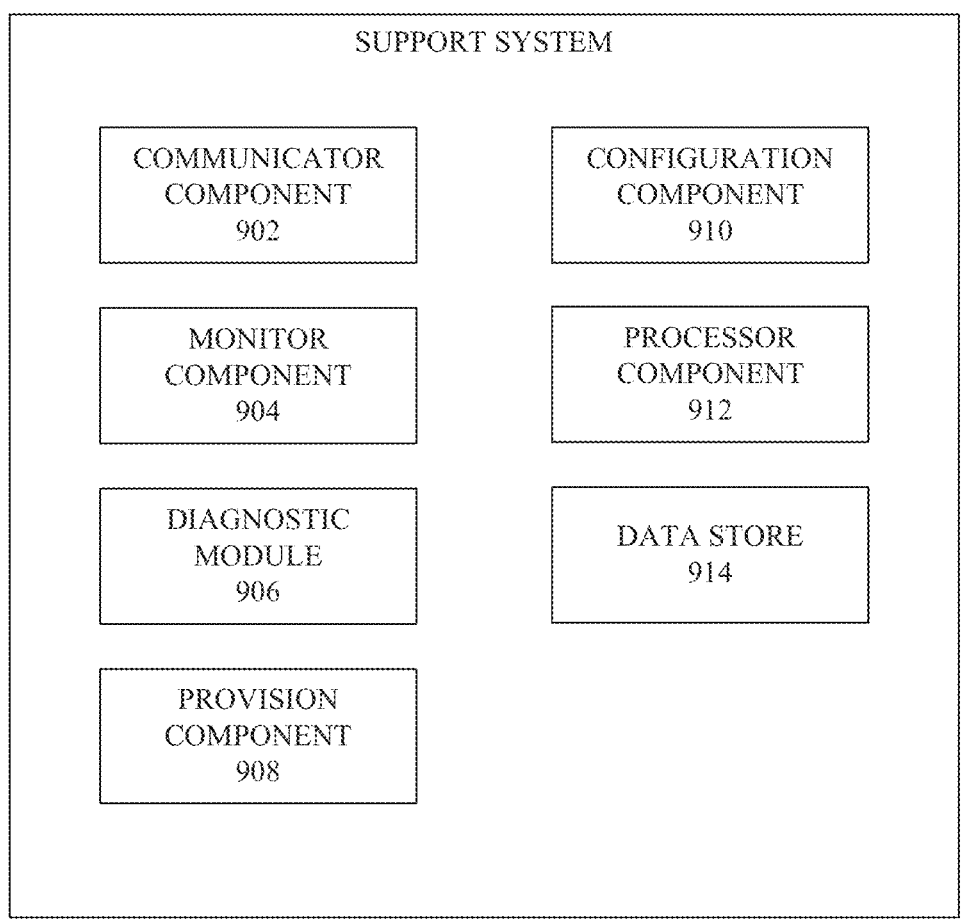
FIG. 9 depicts a block diagram of an example support system in accordance with an embodiment of the disclosed subject matter.

FIG. 9 illustrates a block diagram of an example support system 900 in accordance with an embodiment of the disclosed subject matter. The support system 900 can be employed to facilitate establishing and maintaining communications between STBs and meter components in the communication network environment. In an aspect, the support system 900 can contain a communicator component 902 that can receive or transmit information to components (e.g., STB, meter component) associated with the support system 900. For example, the communicator component 902 can transmit information to the STB or meter component to facilitate setting communication parameters on the STB or meter component, or receive information relating to communication problems between the STB and meter component, to facilitate communications between the STB and meter component.

In another aspect, the support system 900 can comprise a monitor component 904 that can monitor communication conditions or configurations of the meter component and/or the STB, and/or monitor communication conditions between the meter component and STB. The monitor component 904 can receive information indicating, or can detect, a problem with communications between the STB and meter component. The support system 900 also can contain a diagnostic module 906 that can analyze or evaluate information relating to a communication problem between the STB and meter component, based at least in part on the analysis or evaluation, and information (e.g., predefined troubleshooting diagnoses and solutions) that facilitates troubleshooting communication problems between the STB and meter component, the diagnosis module 906 can automatically diagnose the communication problem and automatically generate a solution (e.g., re-configuration of communication parameters) to resolve the communication problem between the STB and meter component.

The support system 900 also can include a provision component 908 that can provision or pre-provision the STB and/or meter component to facilitate establishing communications between the STB and meter component. The provision component 908 can operate in conjunction with a configuration component 910 to configure communication-related parameters of the STB and/or meter component. For example, the provision component 908 and configuration component 910 can set one or more parameters associated with respective communication platforms (e.g., M2M communication components) and/or respective configuration modules of the STB and meter component. In an aspect, the provision component 908 and configuration component 910 can facilitate provisioning and/or configuring the STB and meter component in accordance with predefined policy management criteria to facilitate enforcing desired policy management with regard to communications between the STB and meter component.

In another aspect, the support system 900 can contain a processor component 912 that can work in conjunction with the other components (e.g., communicator component 902, monitor component 904, diagnosis module 906, provision component 908, configuration component 910, etc.) to facilitate performing the various functions of the support system 900. The processor component 912 can employ one or more processors, microprocessors, or controllers that can process data, such as information relating to detected communication problems between an STB and a meter component, information relating to diagnosing and identifying a solution to a detected communication problem, information relating to provisioning or configuring an STB or a meter component to establish or re-establish communications between the STB and meter component, and/or other information, etc., to facilitate operation of the support system 900 and communications between STBs and meter components; and can control data flow between the support system 900 and other components (e.g., STB, meter component, etc.) associated with the support system 900.

The support system 900 also can include a data store 914 that can store data structures (e.g., user data, metadata); code structure(s) (e.g., modules, objects, classes, procedures) or instructions; information relating to detected communication problems between an STB and a meter component, information relating to diagnosing and identifying a solution to a detected communication problem, information relating to provisioning or configuring an STB or a meter component to establish or re-establish communications between the STB and meter component, information relating to operations of the support system 900, etc., to facilitate controlling operations associated with the support system 900, diagnosing a communication problem between the STB and meter component, identifying and implementing a solution to a diagnosed communication problem between the STB and meter component, provisioning and configuring the STB and meter component to facilitate establishing or re-establishing communications between the STB and meter component, etc. In an aspect, the processor component 912 can be functionally coupled (e.g., through a memory bus) to the data store 914 in order to store and retrieve information desired to operate and/or confer functionality, at least in part, to the communicator component 902, monitor component 904, diagnosis module 906, provision component 908, configuration component 910, and/or substantially any other operational aspects of the support system 900.

Figure 10:
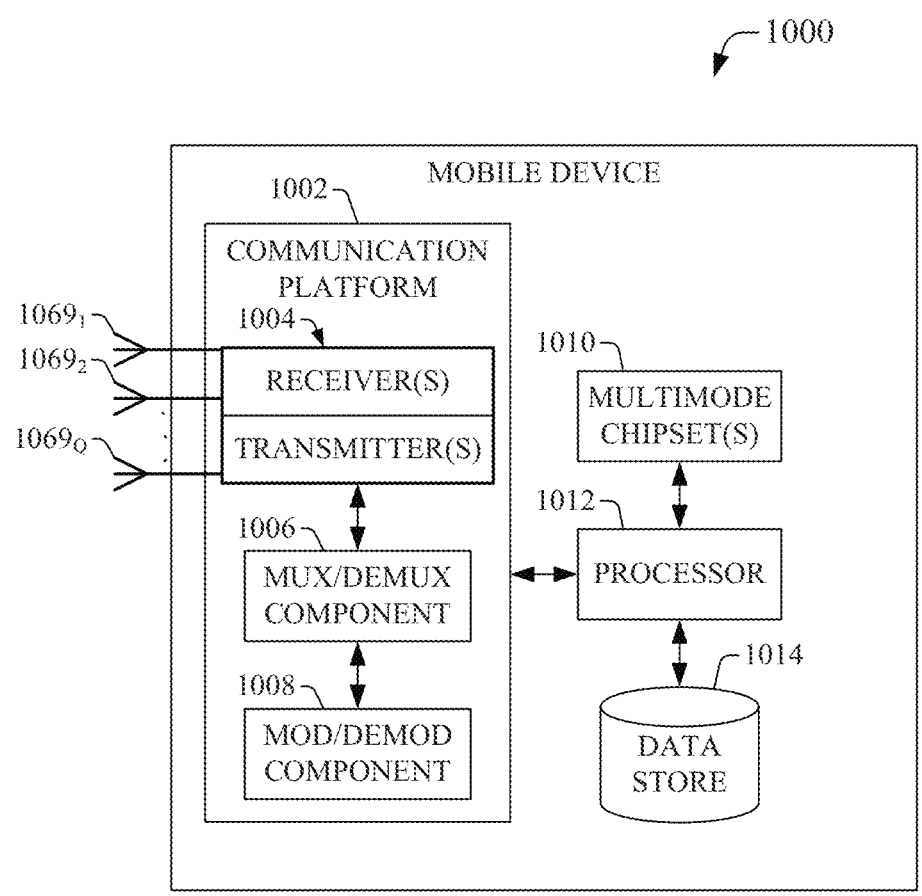
FIG. 10 depicts a block diagram of an example mobile device in accordance with an aspect of the disclosed subject matter.

FIG. 10 depicts a block diagram of an example mobile device 1000 (e.g., UE) in accordance with an aspect of the disclosed subject matter. In an aspect, the mobile device 1000 can be a multimode access terminal, wherein a set of antennas $1069_1$-$1069_Q$ (Q is a positive integer) can receive and transmit signal(s) from and to wireless devices like access points, access terminals, wireless ports and routers, and so forth, that operate in a radio access network. It should be appreciated that antennas $1069_1$-$1069_Q$ are a part of communication platform 1002, which comprises electronic components and associated circuitry that provide for processing and manipulation of received signal(s) and signal(s) to be transmitted; e.g., receivers and transmitters 1004, multiplexer/demultiplexer (mux/demux) component 1006, and modulation/demodulation (mod/demod) component 1008.

In another aspect, the mobile device 1000 can include a multimode operation chipset(s) 1010 that can allow the mobile device 1000 to operate in multiple communication modes in accordance with disparate technical specification for wireless technologies. In an aspect, multimode operation chipset(s) 1010 can utilize communication platform 1002 in accordance with a specific mode of operation (e.g., voice, GPS). In another aspect, multimode operation chipset(s) 1010 can be scheduled to operate concurrently (e.g., when Q>1) in various modes or within a multitask paradigm.

In still another aspect, the mobile device 1000 also can include a processor(s) 1012 that can be configured to confer functionality, at least in part, to substantially any electronic component within the mobile device 1000, in accordance with aspects of the disclosed subject matter. For example, the processor(s) 1012 can facilitate enabling the mobile device 1000 to process data (e.g., symbols, bits, or chips) for multiplexing/demultiplexing, modulation/demodulation, such as implementing direct and inverse fast Fourier transforms, selection of modulation rates, selection of data packet formats, inter-packet times, etc. As another example, the processor(s) 1012 can facilitate enabling the mobile device 1000 to process data relating to measuring respective radio link qualities between the mobile device 1000 and respective APs.

The mobile device 1000 also can contain a data store 1014 that can store data structures (e.g., user data, metadata); code structure(s) (e.g., modules, objects, classes, procedures) or instructions; neighbor cell list; information relating to measuring respective radio link qualities between the mobile device 1000 and respective APs; network or device information like policies and specifications; attachment protocols; code sequences for scrambling, spreading and pilot (e.g., reference signal(s)) transmission; frequency offsets; cell IDs; encoding algorithms; compression algorithms; decoding algorithms; decompression algorithms; and so on. In an aspect, the processor(s) 1012 can be functionally coupled (e.g., through a memory bus) to the data store 1014 in order to store and retrieve information (e.g., neighbor cell list, information relating to measuring radio link levels, frequency offsets, desired algorithms, etc.) desired to operate and/or confer functionality, at least in part, to communication platform 1002, multimode operation chipset(s) 1010, and/or substantially any other operational aspects of the mobile device 1000.

Figure 11:
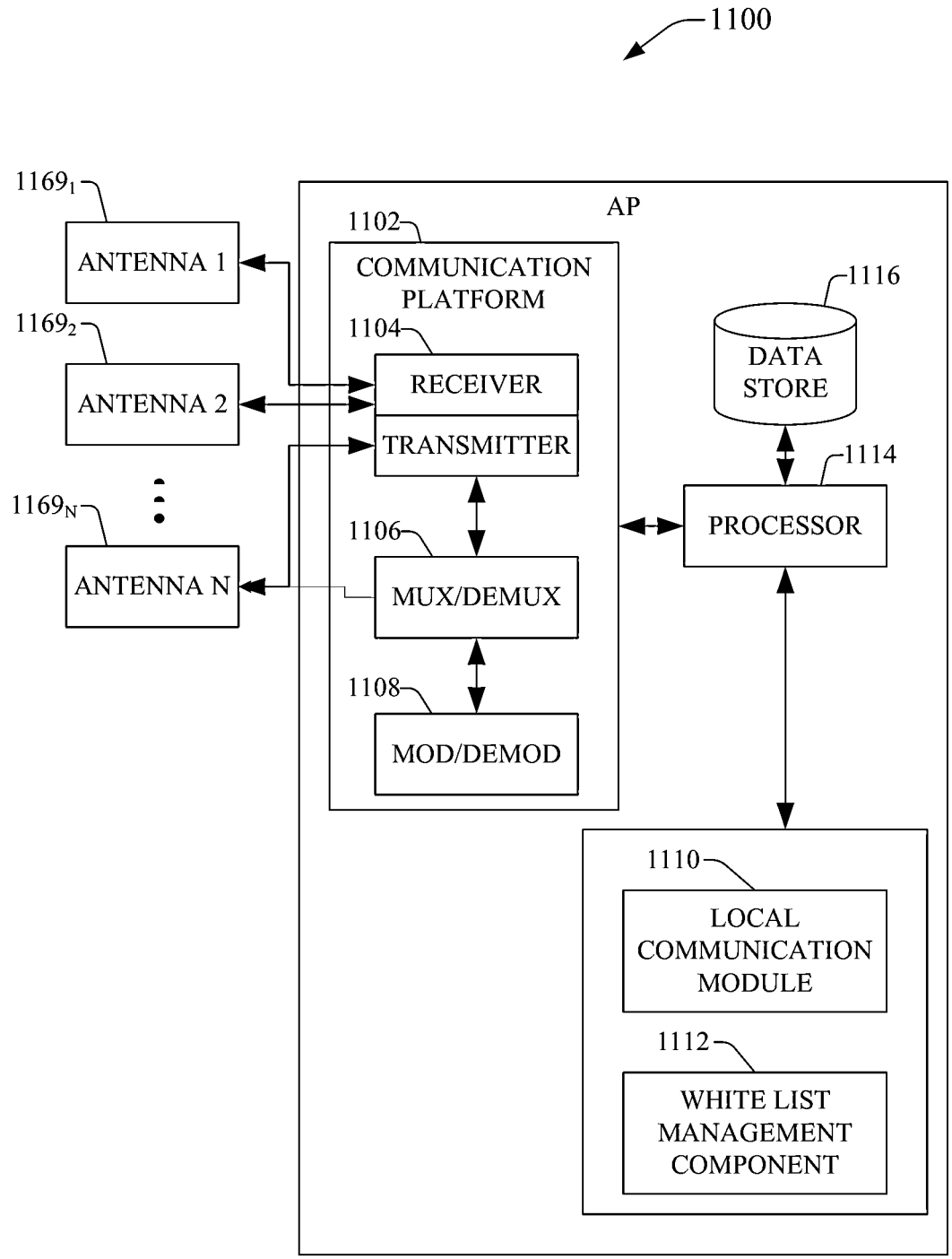
FIG. 11 illustrates a block diagram of an example access point (AP) in accordance with an aspect of the disclosed subject matter.

FIG. 11 illustrates a block diagram of an example AP 1100 (e.g., femtocell, picocell, base station, etc.) in accordance with an aspect of the disclosed subject matter. The AP 1100 can receive and transmit signal(s) from and to wireless devices like access points (e.g., femtocells, picocells, base stations, etc.), access terminals (e.g., UEs), wireless ports and routers, and the like, through a set of antennas $1169_1$-$1169_N$. In an aspect, the antennas $1169_1$-$1169_N$ are a part of a communication platform 1102, which comprises electronic components and associated circuitry that can provide for processing and manipulation of received signal(s) and signal(s) to be transmitted. In an aspect, the communication platform 1102 can include a receiver/transmitter 1104 that can convert signal from analog to digital upon reception, and from digital to analog upon transmission. In addition, receiver/transmitter 1104 can divide a single data stream into multiple, parallel data streams, or perform the reciprocal operation.

In an aspect, coupled to receiver/transmitter 1104 can be a multiplexer/demultiplexer (mux/demux) 1106 that can facilitate manipulation of signal in time and frequency space. The mux/demux 1106 can multiplex information (e.g., data/traffic and control/signaling) according to various multiplexing schemes such as, for example, time division multiplexing (TDM), frequency division multiplexing (FDM), orthogonal frequency division multiplexing (OFDM), code division multiplexing (CDM), space division multiplexing (SDM), etc. In addition, mux/demux component 1106 can scramble and spread information (e.g., codes) according to substantially any code known in the art, e.g., Hadamard-Walsh codes, Baker codes, Kasami codes, polyphase codes, and so on. A modulator/demodulator (mod/demod) 1108 also can be part of the communication platform 1102, and can modulate information according to multiple modulation techniques, such as frequency modulation, amplitude modulation (e.g., M-ary quadrature amplitude modulation (QAM), with M a positive integer), phase-shift keying (PSK), and the like.

In an aspect, the AP 1100 can include local communication module 1110 that can be employed to establish communication sessions without having to communicate through a VPN tunnel route to the core network. The local communication module 1110 can enable communications connection between the meter component and the STB via the AP 1100.

In another aspect, the AP 1100 optionally can include a white list management component 1112 that can facilitate managing or maintaining a white list, when a white list is employed, that includes information, such as communication device identifiers (e.g., MISDNs), associated with other communication devices (e.g., STB, UEs, meter component, etc.) that can connect to the AP 1100 to communicate voice or data. For example, the respective communication device identifiers of the meter component, STB, and/or UEs can be included in white list associated with the AP 1100, and the white list can be used to enable call or communication administration for the STB, for example, with regard to communications between the meter component and the STB and/or communications between the UE and the STB. The white list can be stored by the AP access gateway and a copy of the white list also can be downloaded to and/or stored in the AP 1100.

The AP 1100 also can comprise a processor(s) 1114 that can be configured to confer and/or facilitate providing functionality, at least partially, to substantially any electronic component in or associated with the AP 1100. For instance, the processor(s) 1114 can facilitate operations on data (e.g., symbols, bits, or chips) for multiplexing/demultiplexing, modulation/demodulation, such as effecting direct and inverse fast Fourier transforms, selection of modulation rates, selection of data packet formats, inter-packet times, etc. The processor(s) 1114 also can facilitate other operations on data to facilitate establishing communication sessions without having to communicate through a VPN tunnel route to the core network, establishing a communications connection between the meter component and the STB via the AP 1100, managing or maintaining a white list (when a white list is employed) that includes information, such as communication device identifiers associated with other communication devices that can connect to the AP 1100 to communicate voice or data, etc.

In another aspect, the AP 1100 can include a data store 1116 that can store data structures; code instructions; rate coding information; information relating to measurement of radio link quality or reception of information related thereto; information relating to establishing a communications connection between the meter component and the STB via the AP 1100, white list information, information relating to managing or maintaining the white list; system or device information like policies and specifications; code sequences for scrambling; spreading and pilot transmission; floor plan configuration; access point deployment and frequency plans; scheduling policies; and so on. The processor(s) 1114 can be coupled to the data store 1118 in order to store and retrieve information (e.g., information, such as algorithms, relating to multiplexing/demultiplexing or modulation/demodulation, information relating to radio link levels, information relating to establishing communication connections associated with the STB, UE, and/or meter component, information relating to the white list, etc.) desired to operate and/or confer functionality to the communication platform 1102, the local communication module 1110, the white list management component 1112, and/or other operational components of AP 1100.

In view of the example systems described herein, example methods that can be implemented in accordance with the disclosed subject matter can be better appreciated with reference to flowcharts in FIGS. 12-19. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

Figure 12:
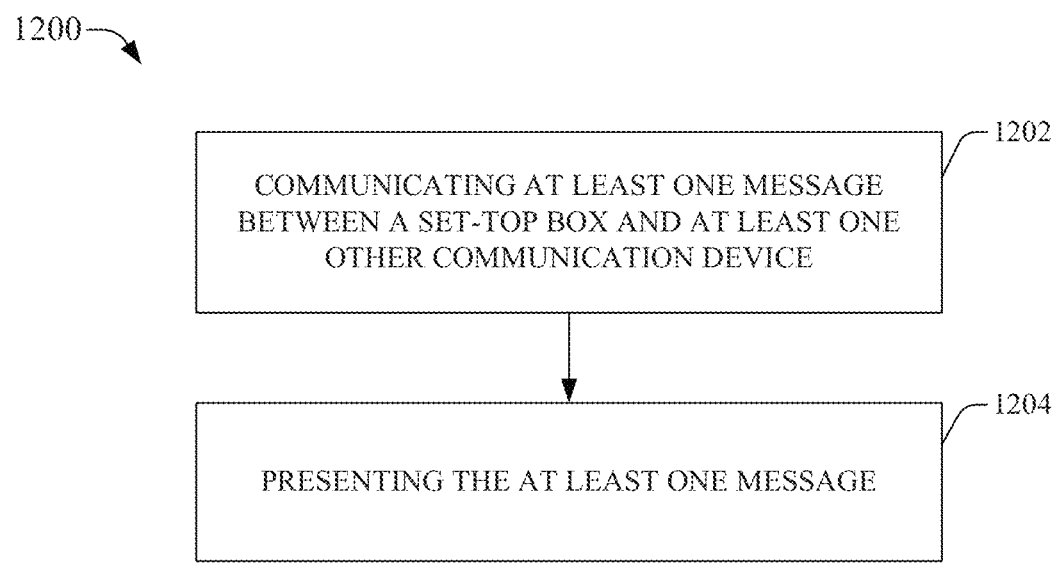
FIG. 12 illustrates a flowchart of an example method that can facilitate communication of messages associated with an STB in accordance with various aspects and embodiments of the disclosed subject matter.

FIG. 12 presents a flowchart of an example method 1200 that can facilitate communication of messages (e.g., text messages, meter readings, video content, audio content, etc.) associated with an STB in accordance with various aspects and embodiments of the disclosed subject matter. At 1202, at least one message can be communicated between an STB and at least one other communication device. The at least one other communication device can be, for example, a UE (e.g., mobile phone, laptop computer, etc.), a meter component (e.g., smart meter), or other communication device, such as a PC. The meter component and STB each can employ M2M communications to facilitate communication between each other, wherein the at least one message can be communication via a wireless connection (e.g., via the femtocell, via a Wi-Fi connection facilitated by a home gateway, etc.) or a wireline connection (e.g., Ethernet connection facilitate by the home gateway).

At 1204, the at least one message can be presented or displayed, for example, by a presentation component (e.g., display screen on a display component, audio speakers, etc.) as facilitated by at least one of the STB or the at least one other communication device. When the at least one message has been composed using the STB, and transmitted to the at least one other communication device, the at least one other communication device can present or display the at least one message, for example, on a display screen or other interface of the at least one other communication device. When the at least one message has been composed using the at least one other communication device, and transmitted to the STB, the STB can present or display the at least one message, for example, on a display screen or other interface of the STB, and/or can facilitate presentation or display of the at least one message on an associated display component (e.g., IPTV) or display screen or interface of an associated remote control component.

Figure 13:
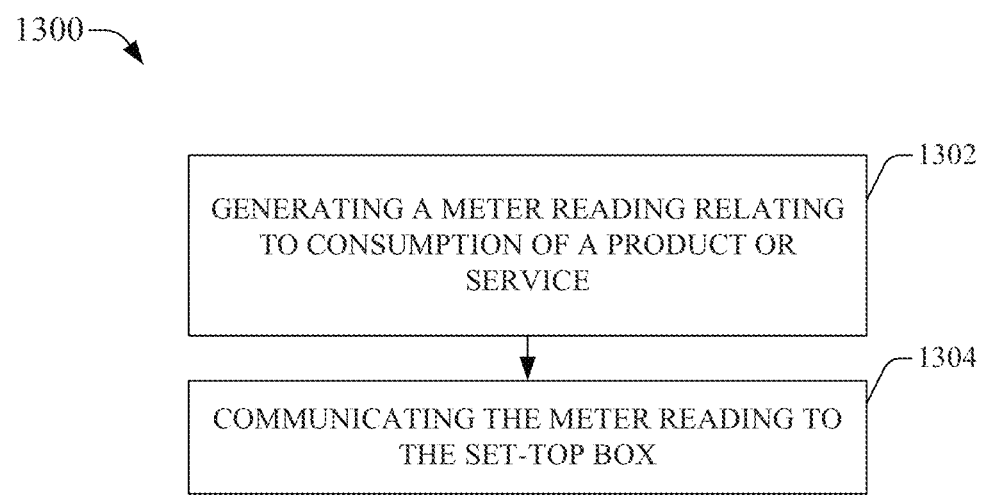
FIG. 13 depicts a flowchart of an example method that can facilitate communication of information relating to a meter reading to at least an STB in accordance with an aspect of the disclosed subject matter.

FIG. 13 depicts a flowchart of an example method 1300 that can facilitate communication of information relating to a meter reading to at least an STB in accordance with an aspect of the disclosed subject matter. At 1302, a meter reading relating to consumption of a product or service can be generated based at least in part tracked consumption of the product or service over a specified period of time. The meter reading associated with a customer/subscriber can be generated periodically or in response to a request, for example. The meter component can monitor and track consumption of the product or service associated with the customer's account with a utility or service provider. The meter reading, which can include the product or service usage and/or corresponding cost of such usage and/or other desired information, can be generated. Historical or aggregate meter readings also can be requested and/or periodically provided as well, when desired.

At 1304, the meter reading can be communicated to the STB. In an aspect, the meter component can transmit the meter reading to the STB associated with the customer/subscriber via a wireless connection (e.g., via an AP, such as a femtocell or picocell; via a Wi-Fi connection associated with a home gateway) or wireline connection (e.g., Ethernet connection facilitated by a home gateway). The meter reading received by the STB can be displayed on the STB or associated display component (e.g., IPTV) to be viewed for accuracy and validation by the customer/subscriber and forwarded to the remote data center of the utility or service provider, as more fully disclosed herein.

Figure 14:
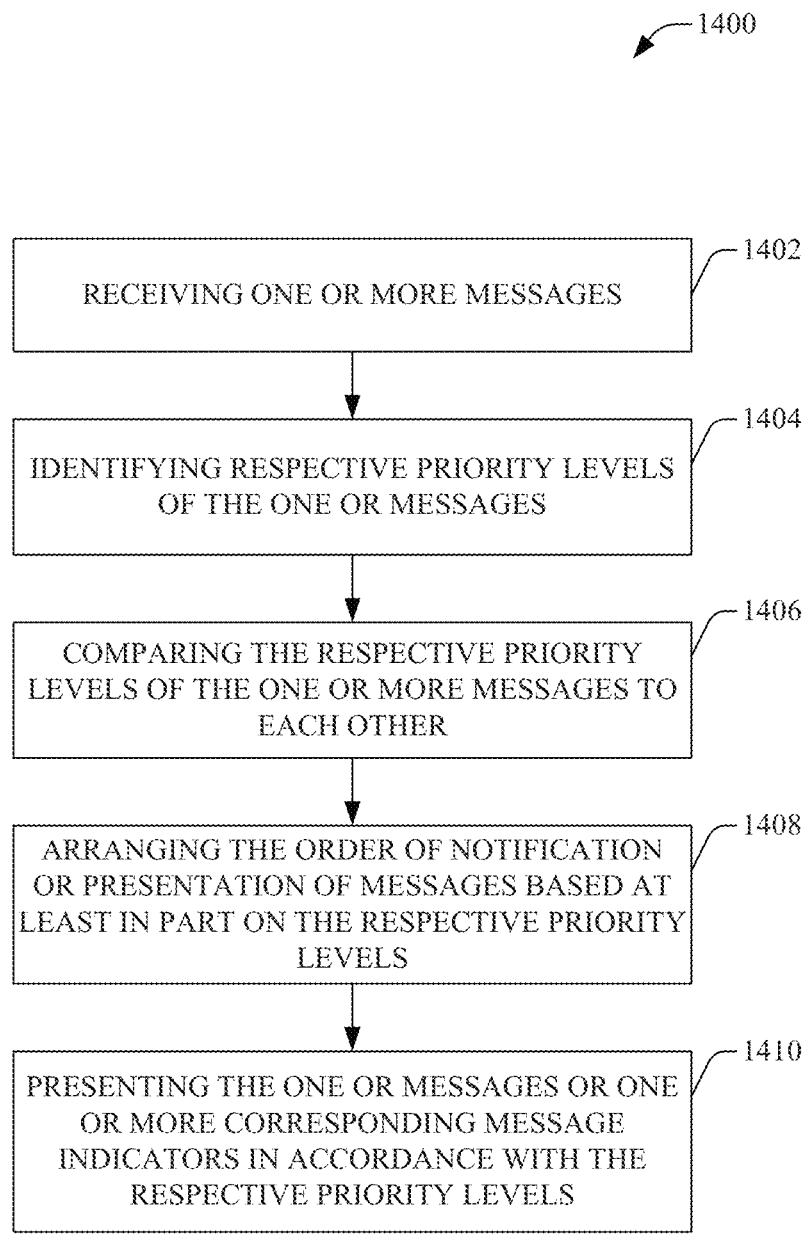
FIG. 14 illustrates a flowchart of an example method that can facilitate communication of messages associated with an STB in accordance with an aspect of the disclosed subject matter.

FIG. 14 illustrates a flowchart of an example method 1400 that can facilitate communication of messages associated with an STB in accordance with an aspect of the disclosed subject matter. At 1402, one or more messages (e.g., text message, meter reading, video content, audio content, etc.) can be received. In an aspect, one or more messages can be received from one or more communication devices (e.g., UE, meter component, etc.) by the STB.

At 1404, respective priority levels of the one or more messages can be identified. A received message can have a priority level indicator or no priority level indicator associated therewith. If a received message does not have a priority level indicator associated therewith, the STB can analyze the message to identify or determine a priority level for the message based at least in part on associated metadata (e.g., sender information, time message is sent, etc.) and/or content of the message, or can assign such message a low priority level without analyzing the message, as desired. If the message has an associated priority level indicator (e.g., high or urgent priority, low priority, etc.), the STB can assign a priority level, which corresponds to the priority level indicator, to that message.

At 1406, the respective priority levels of the one or more messages can be compared to each other. For instance, the STB can compare the priority level of a first message with the priority level of any other messages in a message queue of messages of or to which the subscriber or other user of the STB is to be notified or have presented. At 1408, the order of notification or presentation of messages can be arranged based at least in part on respective priority levels associated with the messages. Each message can be arranged in relation to other received messages, if any, in the message queue in order of priority based at least in on the respective priority levels of the messages.

At 1410, the one or more messages or one or more respective message indicators respectively associated with the one or more messages can be presented in accordance with the respective priority levels of the one or more messages. The messages or respective message indicators that correspond to the messages can be presented on a desired display screen or otherwise presented (e.g., audio beep, LED indicator, etc.) in the order of priority from highest priority level to lowest priority level. When a particular message has reached the point of having a highest priority level in relation to other messages received by the STB and currently in the message queue, that message and/or associated message indicator can be presented to the subscriber or other user. In an aspect, as desired by the subscriber, for example, the message can be presented on a desired display, such as a display screen of an IPTV (e.g., on a dedicated portion of the display screen on a current channel or on a dedicated channel), a display screen on the STB, or on a display screen of the remote control component, or a message indicator (e.g., visual, audio, or other sensory indicator) associated with that message can be presented via the desired display screen to provide a visual and/or audio indicator or other interface (e.g., audio driver or speaker, LED, vibration emitter, etc.) associated with the STB and/or remote control component.

Figure 15:
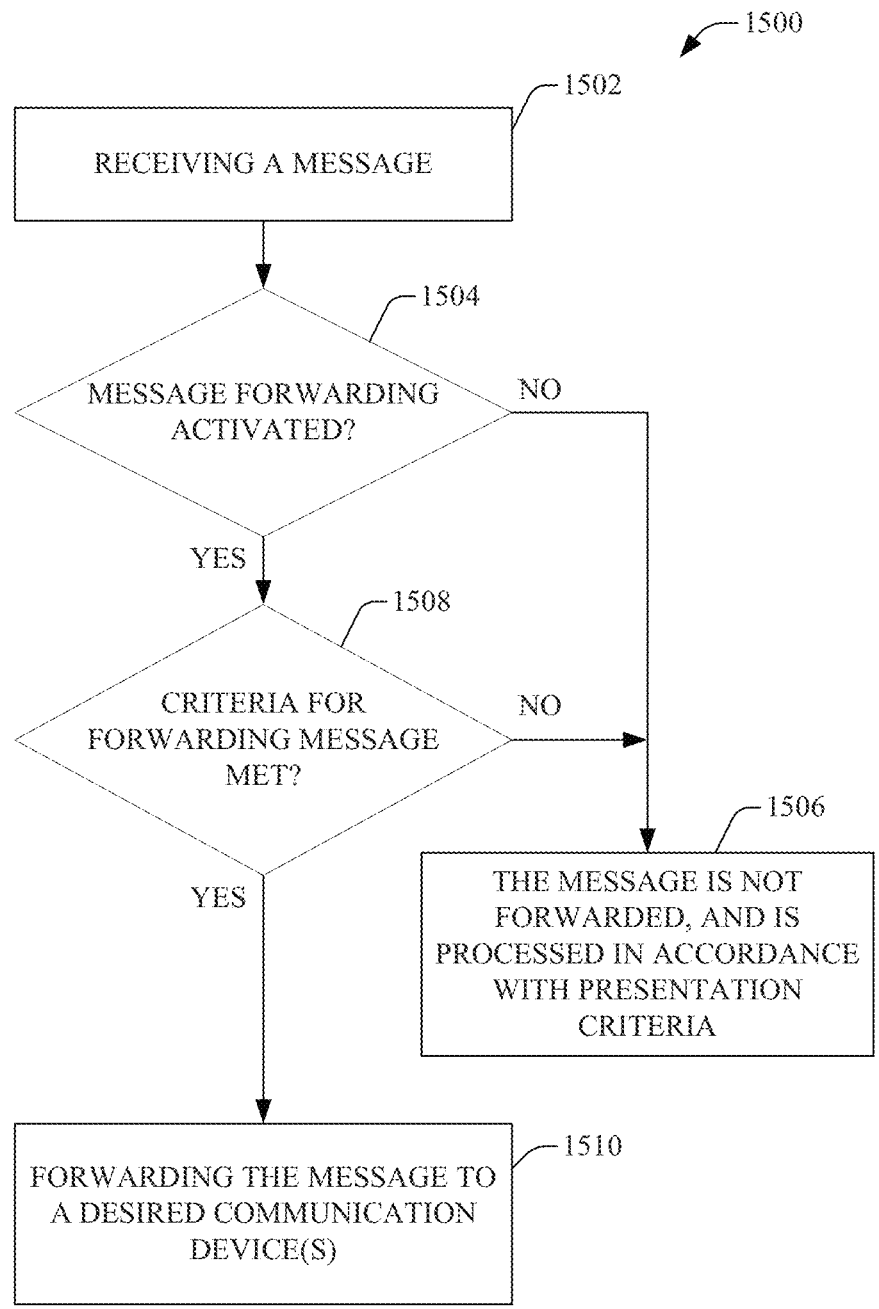
FIG. 15 illustrates a flowchart of an example method that can facilitate forwarding a message associated with an STB in accordance with an aspect of the disclosed subject matter.

FIG. 15 illustrates a flowchart of an example method 1500 that can facilitate forwarding a message associated with an STB in accordance with an aspect of the disclosed subject matter. At 1502, a message can be received. In an aspect, the STB can receive a message (e.g., text message, meter reading, video content, audio content, etc.) from another communication device (e.g., UE, meter component, computer, etc.) At 1504, a determination can be made regarding whether message forwarding is activated. If it is determined that message forwarding has not been activated, at 1506, the message is not forwarded to another communication device, and the message can be processed in accordance with the predefined presentation criteria (e.g., higher priority messages or associated indicators presented before lower priority messages or associated indicators, display the message or indicator on a display screen(s) specified by subscriber, etc.).

If, at 1504, it is determined that message forwarding is activated, at 1508, a determination can be made regarding whether the message is to be forwarded based at least in part on predefined routing criteria, which can be a portion of the predefined presentation criteria, for example. The predefined presentation criteria or associated predefined routing criteria can relate to, for example, the priority level of the message (e.g., only forward messages that meet at least a predefined minimum priority threshold level), the available communication devices to which a message can be forwarded, type of content to be forwarded (e.g., forward textual content, but not video content; forward content that is below a predefined maximum threshold file size; etc.), sender of the message (e.g., forward business-related messages, but not personal messages, or vice versa; forward messages from specified persons only; etc.), desired forwarding or routing of messages as specified by the subscriber, available communication connections, etc. Attributes of the message, such as priority level, sender of the message, type of message, metadata associated with the message, etc., forwarding instructions of the subscriber, and other presentation or routing criteria can be evaluated and a determination can be made regarding whether the message meets the predefined routing criteria (e.g., and thus, corresponding routing rules) for forwarding the message to facilitate determining whether the message is to be forwarded, and if so, to which communication device should the message be forwarded.

If it is determined that the message is not to be forwarded, based at least in part on the predefined routing criteria, the method 1500 can proceed to reference numeral 1506, wherein the message can be processed in accordance with the predefined presentation criteria. If, at 1508, it is determined that the message is to be forwarded, at 1510, the message can be forwarded (e.g., automatically or dynamically routed) to at least one other desired communication device in accordance with the predefined routing criteria.

Figure 16:
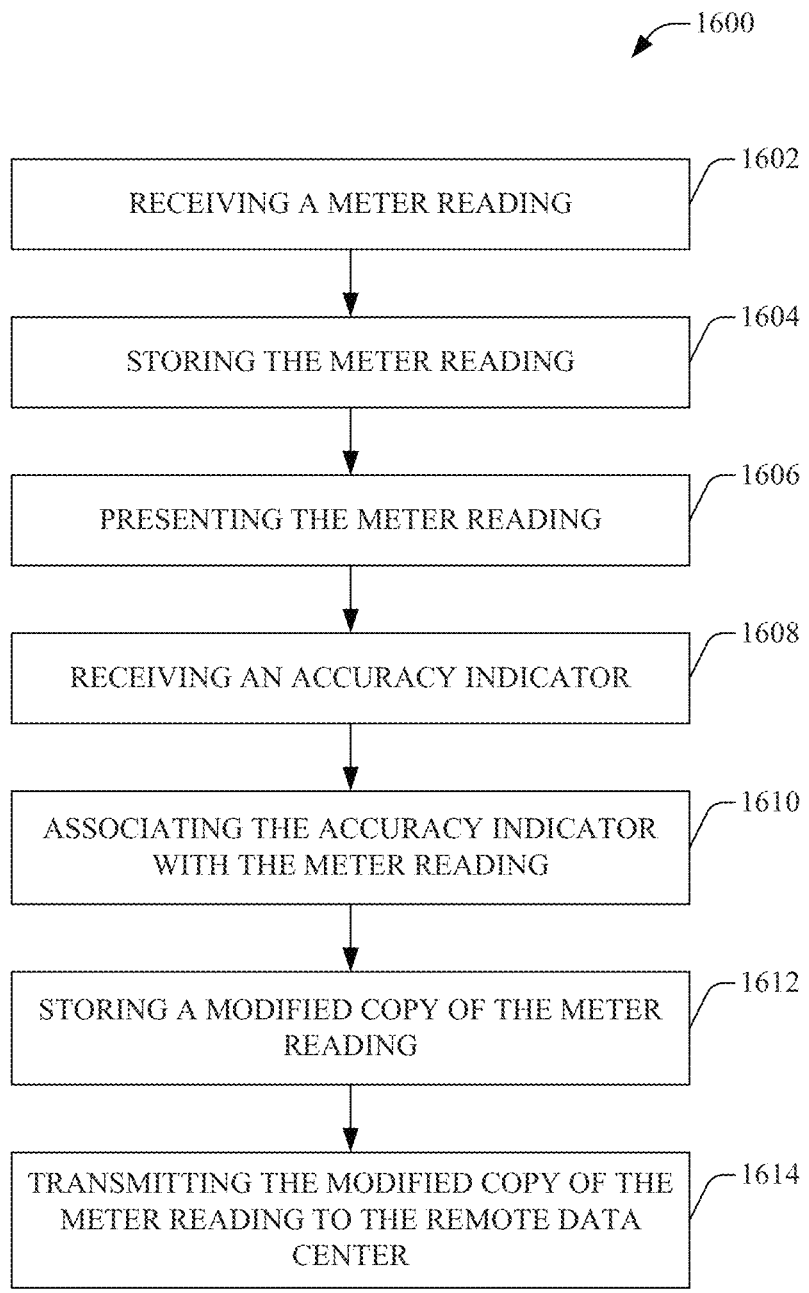
FIG. 16 depicts a flowchart of an example method that can facilitate validation of meter readings associated with a meter component in accordance with an embodiment of the disclosed subject matter.

FIG. 16 illustrates a flowchart of an example method 1600 that can facilitate validation of meter readings associated with a meter component in accordance with an embodiment of the disclosed subject matter. At 1602, a meter reading can be received. In an aspect, a meter reading relating to consumption of a product or a service over a specified period of time, wherein the product or service is provided by a utility or service provider to a customer/subscriber, can be generated by a meter component and communicated to the STB associated with the subscriber. The STB can receive the meter reading from the meter component via a wireless connection (e.g., via an AP, such as a femtocell or picocell; via a Wi-Fi connection associated with a home gateway) or wireline connection (e.g., Ethernet connection facilitated by a home gateway). At 1604, the meter reading can be stored in a data store. The STB can store the meter reading in a data store associated with the STB.

At 1606, the meter reading can be presented (e.g., displayed or otherwise presented to the subscriber) in accordance with the predefined presentation criteria. The presentation criteria can relate to, for example, a priority level of the message (e.g., received meter reading), presentation preferences of the subscriber relating to which display or interface to present the meter reading, when to present the meter reading or associated message indicator, routing preferences, etc.

At 1608, an accuracy indicator can be received. In an aspect, the STB can receive an accuracy indicator from the subscriber, for example, after the subscriber has reviewed the meter reading on a desired display screen (e.g., IPTV display screen, STB display screen) to determine whether the meter reading is accurate. The subscriber can select the desired accuracy indicator using the remote control component or an interface on the STB, and the STB can receive the selected accuracy indicator. The accuracy indicator can comprise, for example, a valid indicator that can indicate the meter reading has been reviewed by the subscriber and the subscriber has determined the meter reading to be valid, or an invalid or a dispute indicator that can indicate the subscriber has been reviewed the meter reading and the subscriber disputes the accuracy of the meter reading.

At 1610, the desired accuracy indicator can be associated (e.g., linked) with the meter reading. In an aspect, the accuracy indicator selected by the subscriber can be associated with the meter reading and a representation of the accuracy indicator can be included on a copy of the meter reading. As desired, there can be a block available on the meter reading for the subscriber to enter other information providing details of a dispute of the meter reading and/or include meter reading information the subscriber believes to be correct, although the subscriber will be unable to change the meter reading values (e.g., amount of consumption, charges, etc.) as provided by the meter component. The STB can receive the additional information from the subscriber via the remote control component or the interface of the STB. The additional information can be associated with the meter reading and a representation of the additional information can be included in the copy of the meter reading.

At 1612, the copy (e.g., modified copy) of the meter reading can be stored. In an aspect, the copy of the meter reading, which includes the desired accuracy indicator and/or additional information relating to the meter reading, can be stored in the data store associated with the STB. At 1614, the copy (e.g., modified copy) of the meter reading can be transmitted to the remote data center associated with the utility or service provider. In an aspect, the STB can transmit the copy of the meter reading to the remote data center via a wireless or wireline connection.

Figure 17:
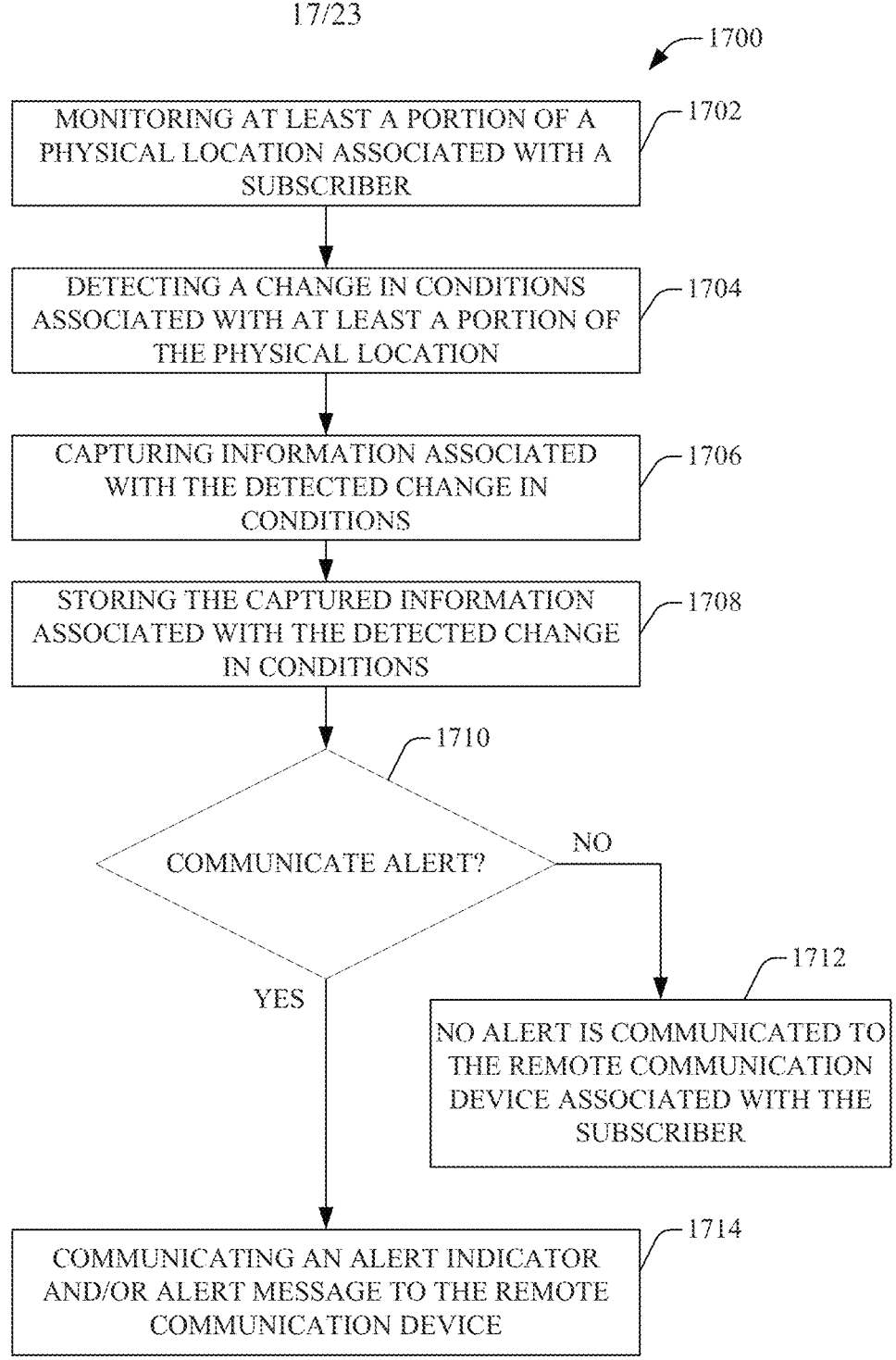
FIG. 17 depicts a flowchart of an example method that can alert a subscriber on a remote communication device of a monitored condition associated with a physical location (e.g., home, business, etc.) associated with the subscriber in accordance with an embodiment of the disclosed subject matter.

FIG. 17 illustrates a flowchart of an example method 1700 that can alert a subscriber on a remote communication device of a monitored condition associated with a physical location (e.g., home, business, etc.) associated with the subscriber in accordance with an embodiment of the disclosed subject matter. Method 1700 can be employed to alert the subscriber to detected change in conditions associated with the physical location, for example, when use of the STB with the monitoring system is the preferred method of monitoring conditions and alerting the subscriber, or when it is a back-up option for alerting the subscriber and the primary option (e.g., monitoring system itself employing a communication device to alert the subscriber) is not available.

At 1702, at least a portion of a physical location associated with a subscriber can be monitored. In an aspect, a subscriber associated with a physical location (e.g., home, business, etc.) can employ a monitoring system to monitor all or a desired portion of the physical location. The monitoring system can employ one or more capture components (e.g., video cameras, audio capturing components, etc.) that can capture information (e.g., video, audio, etc.) relating to conditions of the desired portion of the physical location being monitored.

At 1704, a change in conditions associated with at least a portion of the physical location can be detected. In an aspect, the monitoring system can employ one or more sensor components that can detect changes in conditions associated with at least a portion of the physical location being monitored. A sensor component can be, for example, a noise detector that is triggered when the noise level meets or exceeds a predefined minimum threshold noise level; a movement detector that can detect movement in an area being sensed by the sensor component and can be triggered when there is sufficient amount of movement detected to meet or exceed a predefined minimum threshold amount of movement; a thermal detector that can detect changes in temperature in the area sensed by the thermal detector and can trigger a change in conditions when there is at least a predefined threshold amount of change in temperature detected; etc.

At 1706, information associated with the detected change in conditions can be captured. In an aspect, one or more capture components can capture information (e.g., video, audio, etc.) in an area where a sensor component has been triggered, and/or an area in proximity to the area where the sensor component has been triggered. The one or more capture components can be continuously or periodically capturing, or can be automatically triggered to capture information in response to the triggering of the sensor component.

At 1708, the captured information associated with the detected change in conditions can be stored. In an aspect, at least information captured in response to a detected change in conditions can be stored in the data store associated with the STB and/or a data store that is part of the monitoring system.

At 1710, a determination can be made regarding whether an alert relating to the detected change in conditions is to be presented to a remote communication device associated with the subscriber, based at least in part on predefined alert criteria, which can be a portion of the predefined presentation criteria. The predefined alert criteria can relate to, for example, priority level associated with the detected change in condition, type of change in condition detected, routing of the alert indicator or alert message, remote communication devices available at the time of the alert or potential alert, type of alert (e.g., alert indicator only, alert indicator and alert message, etc.), etc. For example, the predefined alert criteria can specify that a detected change in condition having a priority level that at least meets a predefined minimum threshold priority level for alerting the subscriber on the subscriber's remote communication device can result in an alert indicator and/or alert message being sent to the remote communication device of the subscriber in response to that detected change in condition.

If it is determined that the detected change in conditions does not meet the predefined alert criteria for alerting the remote communication device, at 1712, no alert is communicated or presented to the remote communication device associated with the subscriber. As desired and in accordance with the predefined presentation criteria, a local alert indicator (e.g., visual, audio, or other sensory indicator) or alert message, which can comprise all or a portion of the captured information and/or information relating to the detected change in condition, can be presented via the STB on the desired display screen (e.g., display screen(s) on IPTV, STB, and/or remote control component) and/or interface (e.g., audio driver or speaker, LED, vibration emitter, etc.).

If, at 1710, it is determined that the detected change in conditions at least meets the predefined alert criteria, at 1714, an alert indicator and/or alert message can be communicated or presented (e.g., automatically or dynamically communicated or presented) to the remote communication device associated with the subscriber. In an aspect, the STB can transmit an alert indicator (e.g., visual, audio, or other sensory indicator) or alert message, which can comprise all or a portion of the captured information and/or information relating to the detected change in condition, to the remote communication device in accordance with the predefined alert criteria.

Figure 18:
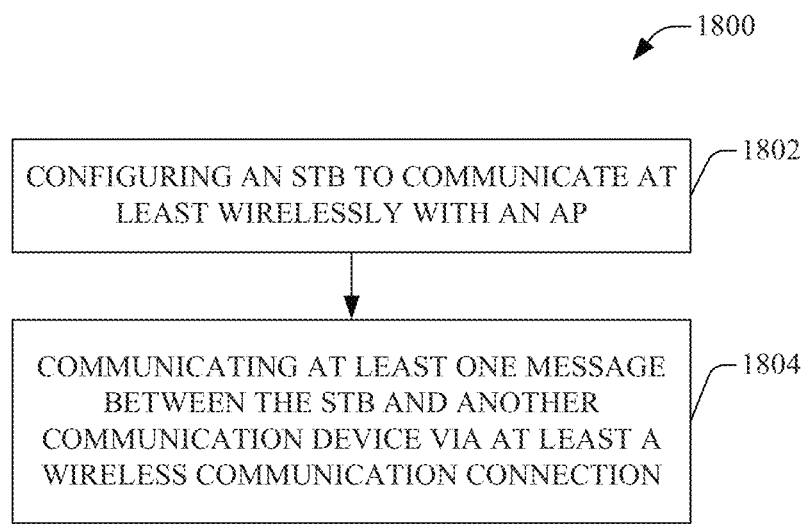
FIG. 18 illustrates a flowchart of an example method that can configure an STB to be able to communicate with other communication devices via a wireless or wireline connection in accordance with an aspect of the disclosed subject matter.

FIG. 18 illustrates a flowchart of an example method 1800 that can configure an STB to be able to communicate with other communication devices via a wireless or wireline connection in accordance with an aspect of the disclosed subject matter. At 1802, an STB can be configured to communicate at least wirelessly with an AP. In an aspect, the STB can be configured to communicate wirelessly via an AP (e.g., femtocell, picocell, etc.) and/or a wireline connection. For example, the STB can comprise a communication platform that can contain an M2M chipset configured to communicate wirelessly with the AP to facilitate wireless communication of messages (e.g., text messages, video content, audio content, meter readings, etc.) between the STB and other communication devices (e.g., UE, meter component, etc.).

At 1804, at least one message can be communicated between the STB and another communication device via at least a wireless communication connection. In an aspect, the STB can transmit or receive the at least one message to or from the other communication device via the wireless communication connection. As desired, one or more other messages also can be communicated between the STB and another communication device via a wireline connection.

Figure 19:
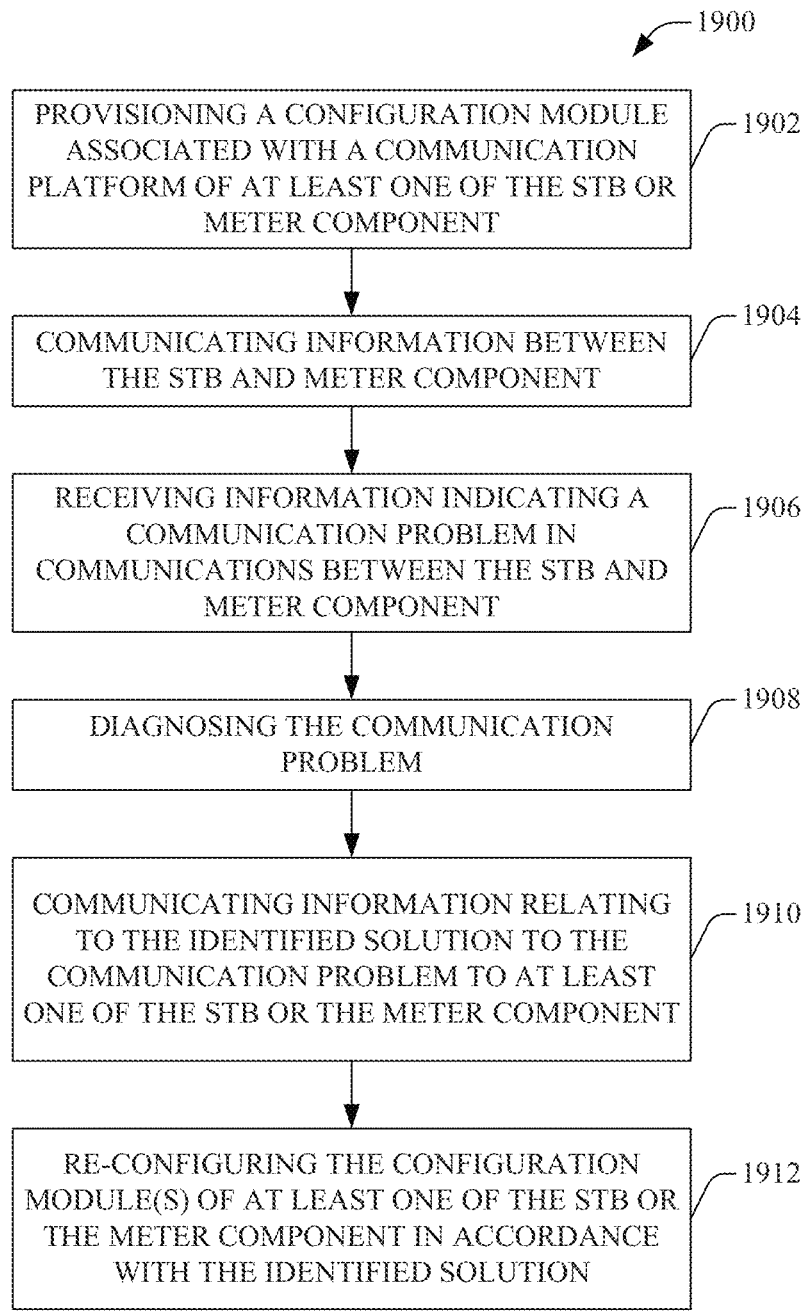
FIG. 19 depicts a flowchart of an example method that can support communications associated with an STB and meter component in accordance with an aspect of the disclosed subject matter.

FIG. 19 illustrates a flowchart of an example method 1900 that that can support communications associated with an STB and meter component in accordance with an aspect of the disclosed subject matter. At 1902, a configuration module associated with a communication platform of at least one of the STB or meter component can be provisioned. In an aspect, a support system can provision or configure a respective communication module(s) associated with a respective communication platform(s) of the STB and/or meter component, wherein the provisioning can performed in part by setting communication parameters to desired values in the configuration module(s) to facilitate communication between the STB and meter component. At 1904, the STB and meter component can communicate (e.g., communication information, such as meter readings) with each other in accordance with the provisioning.

At 1906, information indicating a communication problem in communications between the STB and meter component can be received. In accordance with an aspect, the support system can receive information indicating that a communication problem exists with regard to communications between the STB and meter component, wherein the information can be derived from a message from the STB and/or meter component indicating the communication problem, and/or the support system monitored communication conditions associated with the STB and meter component, and detected the communication problem.

At 1908, the communication problem can be diagnosed. In an aspect, the support system can diagnose the communication problem based at least in part on the received information relating to the communication problem, troubleshooting information that facilitates troubleshooting and rectifying communication problems. The support system can analyze or evaluate the received information and troubleshooting information to facilitate diagnosing the communication problem and identifying a solution to resolve the communication problem. As desired, information relating to the communication problem also can be presented to a desired person (e.g., technician) to facilitate diagnosing and resolving the communication problem. The support system can identify or determine (e.g., automatically) a solution to the communication problem, wherein, example, the solution can be an adjustment or a re-configuration of one or more communication parameters of a configuration module(s) of the STB or meter component that can be performed to facilitate resolving the communication problem.

At 1910, information relating to the identified solution to the communication problem can be communicated to at least one of the STB or the meter component. In an aspect, the support system can communicate information relating to the identified solution the STB and/or the meter component to facilitate re-establishing communications between the STB and meter component.

At 1912, the configuration module(s) of at least one of the STB or the meter component can be re-configured in accordance with the identified solution (e.g., identified re-configuration for the configuration module(s)). The support system can communicate information relating to re-configuration of the configuration module(s) of the STB or meter component to facilitate resolving the communication problem. The configuration module(s) of the STB or meter component can be re-configured using the re-configuration information in accordance with the identified re-configuration for the configuration module(s).

In some aspects the teachings herein can or may be employed in a network that includes macro scale coverage (e.g., a large area cellular network such as a 3G network, typically referred to as a macrocell network) and smaller scale coverage (e.g., a residence-based or building-based network environment). As an access terminal ("AT") moves through such a network, the AT may be served in certain locations by access nodes ("ANs") that provide macro coverage while the AT may be served at other locations by access nodes that provide smaller scale coverage. In some aspects, the smaller coverage nodes may be used to provide incremental capacity growth, in-building coverage, and different services (e.g., for a more robust user experience). In the discussion herein, a node that provides coverage over a relatively large area may be referred to as a macro node. A node that provides coverage over a relatively small area (e.g., a residence) may be referred to as a femto node. A node that provides coverage over an area that is smaller than a macro area and larger than a femto area may be referred to as a pico node (e.g., providing coverage within a commercial building).

A cell associated with a macro node, a femto node, or a pico node may be referred to as a macrocell, a femtocell, or a picocell, respectively. In some implementations, each cell may be further associated with (e.g., divided into) one or more sectors.

In various applications, other terminology may be used to reference a macro node, a femto node, or a pico node. For example, a macro node may be configured or referred to as an access node, base station, access point, eNodeB, macro cell, and so on. Also, a femto node may be configured or referred to as a Home NodeB, Home eNodeB, access point base station, femtocell, and so on.

Figure 20:
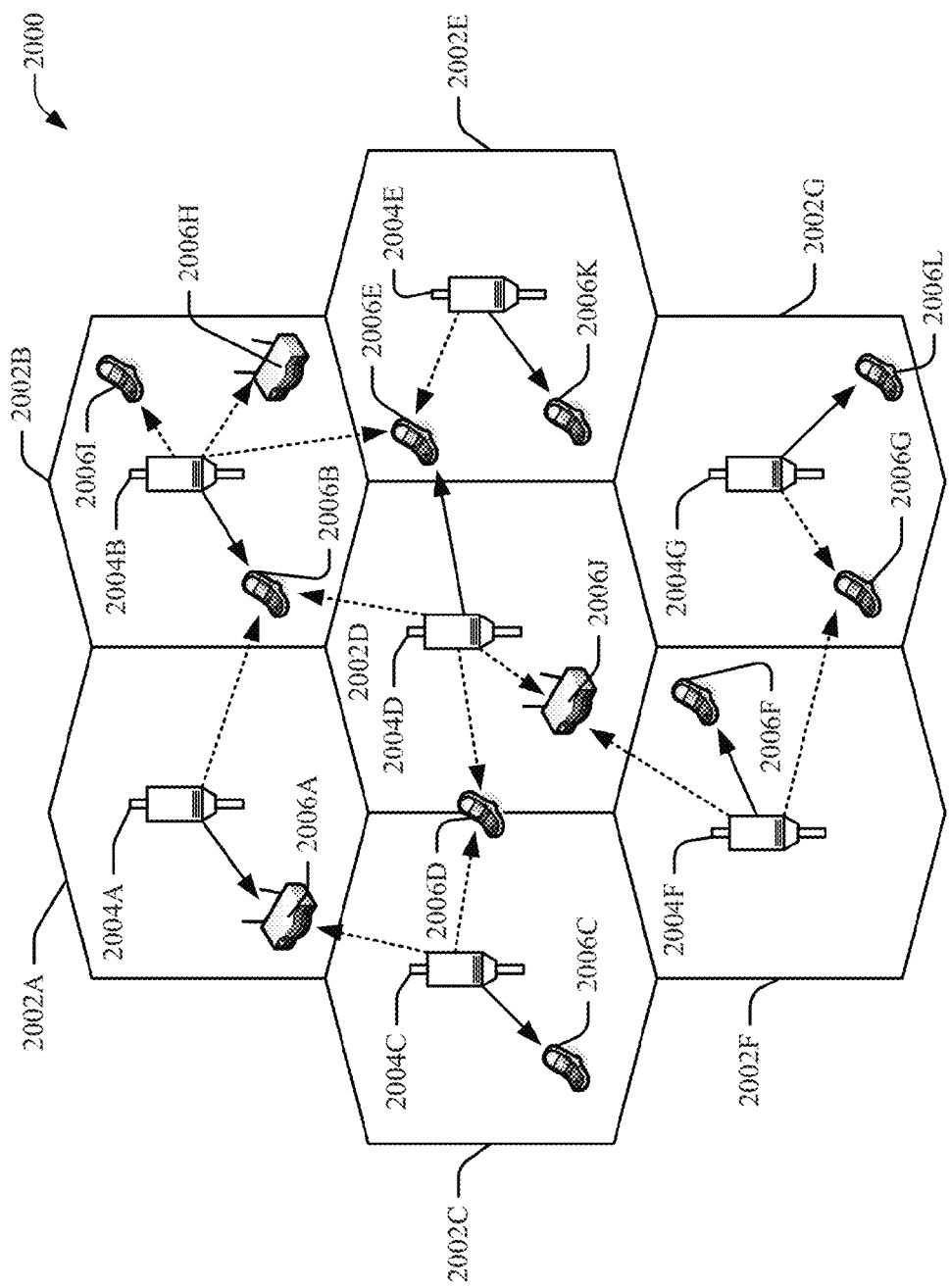
FIG. 20 illustrates an example wireless communication system in accordance with an embodiment of the disclosed subject matter.

FIG. 20 illustrates a wireless communication system 2000, configured to support a number of users, in which the teachings herein may be implemented. The system 2000 provides communication for multiple cells 2002, such as, for example, macro cells 2002A-2002G, with each cell being serviced by a corresponding access node 2004 (e.g., access nodes 2004A-2004G). As shown in FIG. 20, access terminals 2006 (e.g., access terminals 2006A-2006L) may be dispersed at various locations throughout the system over time. Each access terminal 2006 may communicate with one or more access nodes 2004 on a forward link ("FL") and/or a reverse link ("RL") at a given moment, depending upon whether the access terminal 2006 is active and whether it is in soft handoff, for example. The wireless communication system 2000 may provide service over a large geographic region. For example, macro cells 2002A-2002G may cover a few blocks in a neighborhood.

FIG. 19 illustrates an exemplary communication system 1900 where one or more femto nodes are deployed within a network environment. Specifically, the system 1900 includes multiple femto nodes 1910 (e.g., femto nodes 1910A and 1910B) installed in a relatively small scale network environment (e.g., in one or more user residences 1930). Each femto node 1910 may be coupled to a wide area network 1940 (e.g., the Internet) and a mobile operator core network 1950 via a DSL router, a cable modem, a wireless link, or other connectivity means (not shown). As will be discussed below, each femto node 1910 may be configured to serve associated access terminals 1920 (e.g., access terminal 1920A) and, optionally, alien access terminals 1920 (e.g., access terminal 1920B). In other words, access to femto nodes 1910 may be restricted whereby a given access terminal 1920 may be served by a set of designated (e.g., home) femto node(s) 1910 but may not be served by any non-designated femto nodes 1910 (e.g., a neighbor's femto node 1910).

FIG. 20 illustrates an example of a coverage map 2000 where several tracking areas 2002 (or routing areas or location areas) are defined, each of which includes several macro coverage areas 2004. Here, areas of coverage associated with tracking areas 2002A, 2002B, and 2002C are delineated by the wide lines and the macro coverage areas 2004 are represented by the hexagons. The tracking areas 2002 also include femto coverage areas 2006. In this example, each of the femto coverage areas 2006 (e.g., femto coverage area 2006C) is depicted within a macro coverage area 2004 (e.g., macro coverage area 2004B). It should be appreciated, however, that a femto coverage area 2006 may not lie entirely within a macro coverage area 2004. In practice, a large number of femto coverage areas 2006 may be defined with a given tracking area 2002 or macro coverage area 2004. Also, one or more pico coverage areas (not shown) may be defined within a given tracking area 2002 or macro coverage area 2004.

Referring again to FIG. 21, the owner of a femto node 2110 may subscribe to mobile service, such as, for example, 3G mobile service, offered through the mobile operator core network 2150. In addition, an access terminal 2120 may be capable of operating both in macro environments and in smaller scale (e.g., residential) network environments. In other words, depending on the current location of the access terminal 2120, the access terminal 2120 may be served by an access node 2160 of the macro cell mobile network 2150 or by any one of a set of femto nodes 2110 (e.g., the femto nodes 2110A and 2110B that reside within a corresponding user residence 2130). For example, when a subscriber is outside his home, he is served by a standard macro access node (e.g., node 2160) and when the subscriber is at home, he is served by a femto node (e.g., node 2110A). Here, it should be appreciated that a femto node 2120 may be backward compatible with existing access terminals 2120.

A femto node 2110 may be deployed on a single frequency or, in the alternative, on multiple frequencies. Depending on the particular configuration, the single frequency or one or more of the multiple frequencies may overlap with one or more frequencies used by a macro node (e.g., node 2160).

In some aspects, an access terminal 2120 may be configured to connect to a preferred femto node (e.g., the home femto node of the access terminal 2120) whenever such connectivity is possible. For example, whenever the access terminal 2120 is within the user's residence 2130, it may be desired that the access terminal 2120 communicate only with the home femto node 2110.

In some aspects, if the access terminal 2120 operates within the macro cellular network 2150 but is not residing on its most preferred network (e.g., as defined in a preferred roaming list), the access terminal 2120 may continue to search for the most preferred network (e.g., the preferred femto node 2110) using a Better System Reselection ("BSR"), which may involve a periodic scanning of available systems to determine whether better systems are currently available, and subsequent efforts to associate with such preferred systems. With the acquisition entry, the access terminal 2120 may limit the search for specific band and channel. For example, the search for the most preferred system may be repeated periodically. Upon discovery of a preferred femto node 2110, the access terminal 2120 selects the femto node 2110 for camping within its coverage area.

A femto node may be restricted in some aspects. For example, a given femto node may only provide certain services to certain access terminals. In deployments with so-called restricted (or closed) association, a given access terminal may only be served by the macro cell mobile network and a defined set of femto nodes (e.g., the femto nodes 2110 that reside within the corresponding user residence 2130). In some implementations, a node may be restricted to not provide, for at least one node, at least one of: signaling, data access, registration, paging, or service.

In some aspects, a restricted femto node (which may also be referred to as a Closed Subscriber Group Home NodeB) is one that provides service to a restricted provisioned set of access terminals. This set may be temporarily or permanently extended as necessary. In some aspects, a Closed Subscriber Group ("CSG") may be defined as the set of access nodes (e.g., femto nodes) that share a common access control list of access terminals. A channel on which all femto nodes (or all restricted femto nodes) in a region operate may be referred to as a femto channel.

Various relationships may thus exist between a given femto node and a given access terminal. For example, from the perspective of an access terminal, an open femto node may refer to a femto node with no restricted association. A restricted femto node may refer to a femto node that is restricted in some manner (e.g., restricted for association and/or registration). A home femto node may refer to a femto node on which the access terminal is authorized to access and operate on. A guest femto node may refer to a femto node on which an access terminal is temporarily authorized to access or operate on. An alien femto node may refer to a femto node on which the access terminal is not authorized to access or operate on, except for perhaps emergency situations (e.g., 911 calls).

From a restricted femto node perspective, a home access terminal may refer to an access terminal that authorized to access the restricted femto node. A guest access terminal may refer to an access terminal with temporary access to the restricted femto node. An alien access terminal may refer to an access terminal that does not have permission to access the restricted femto node, except for perhaps emergency situations, for example, such as 911 calls (e.g., an access terminal that does not have the credentials or permission to register with the restricted femto node).

For convenience, the disclosure herein describes various functionality in the context of a femto node. It should be appreciated, however, that a pico node may provide the same or similar functionality for a larger coverage area. For example, a pico node may be restricted, a home pico node may be defined for a given access terminal, and so on.

A wireless multiple-access communication system may simultaneously support communication for multiple wireless access terminals. As mentioned above, each terminal may communicate with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out system, a multiple-in-multiple-out ("MIMO") system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex ("TDD") and frequency division duplex ("FDD"). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 21:
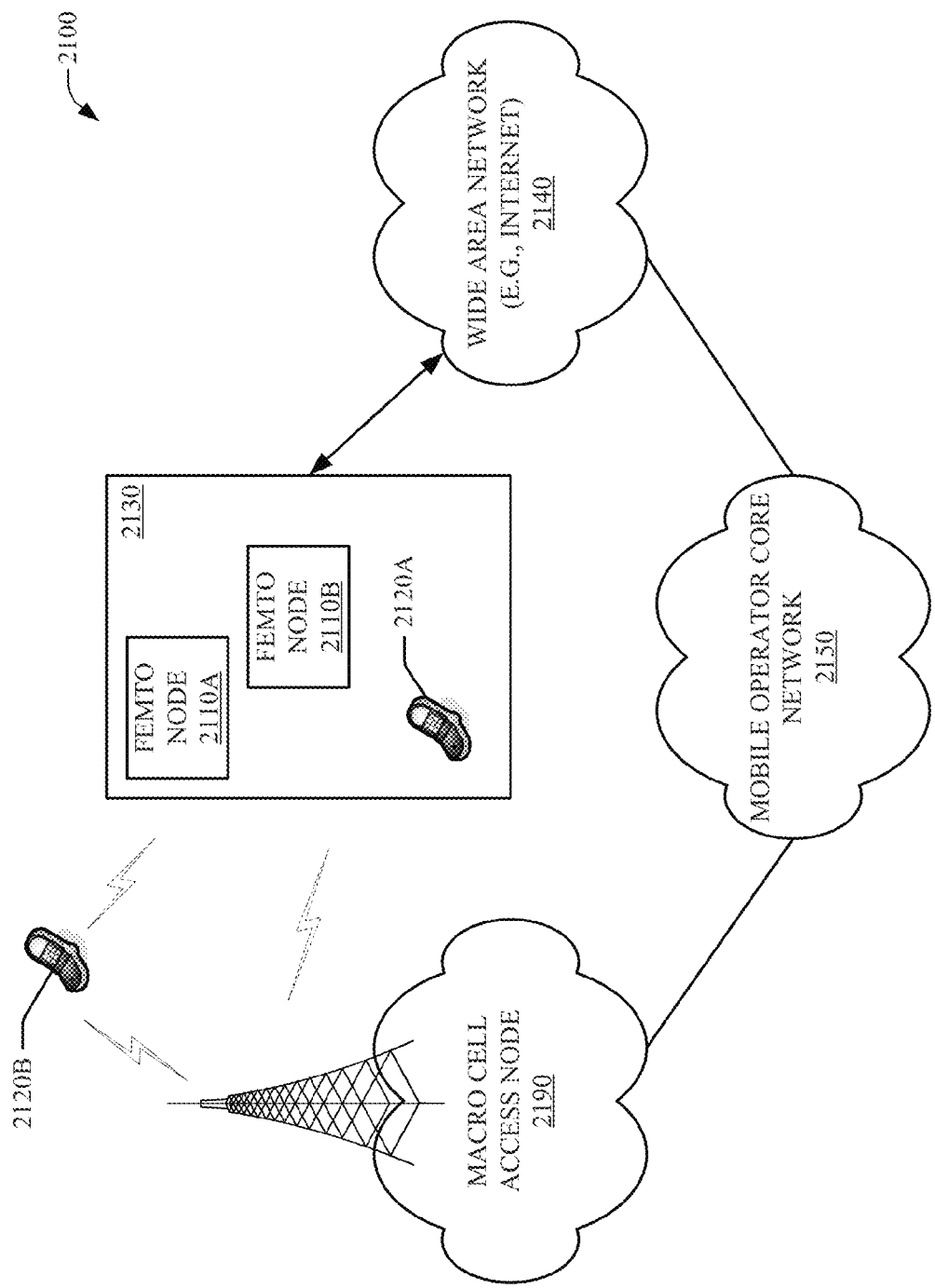
FIG. 21 illustrates an example communication system where one or more femto nodes are deployed within a network environment.
Figure 22:
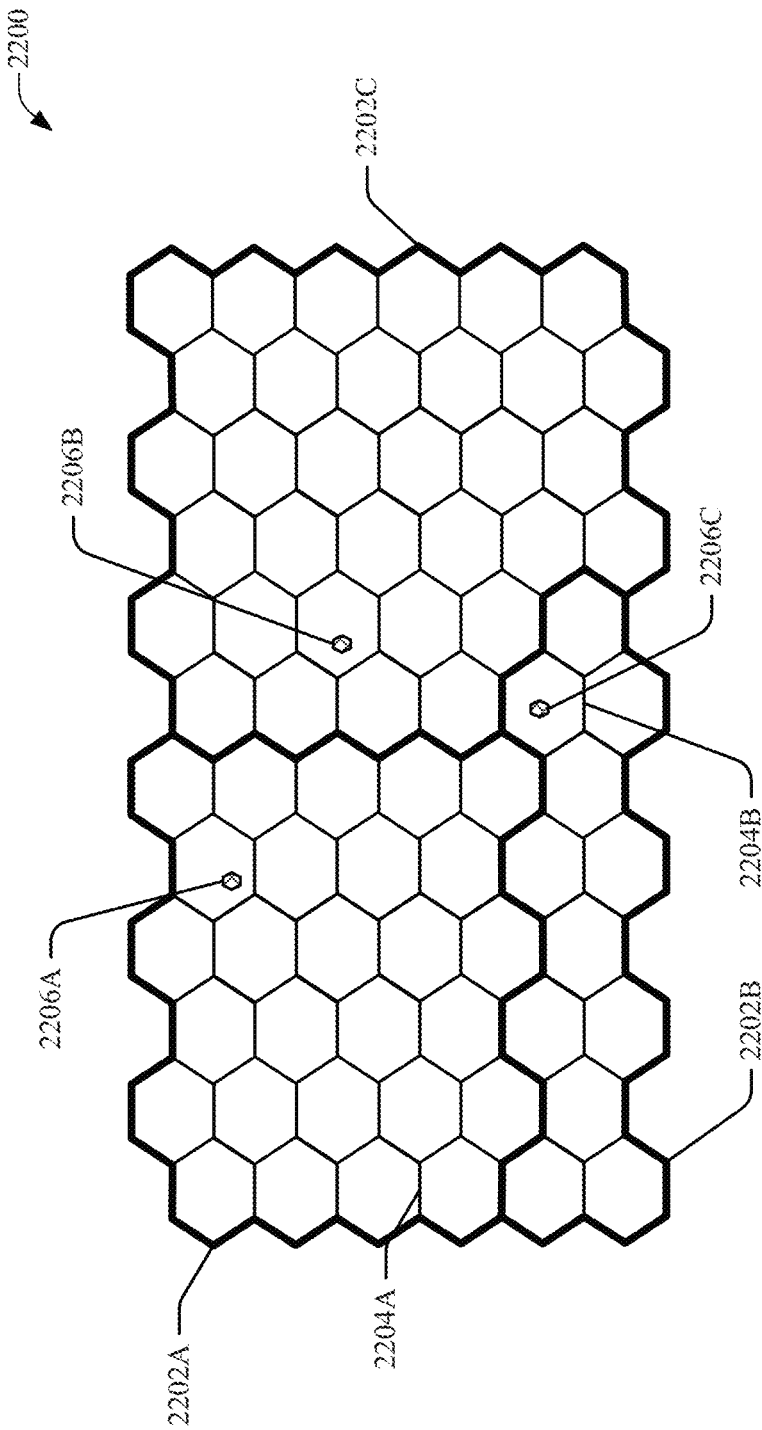
FIG. 22 illustrates an example of a coverage map in accordance with an embodiment of the disclosed subject matter.
Figure 23:
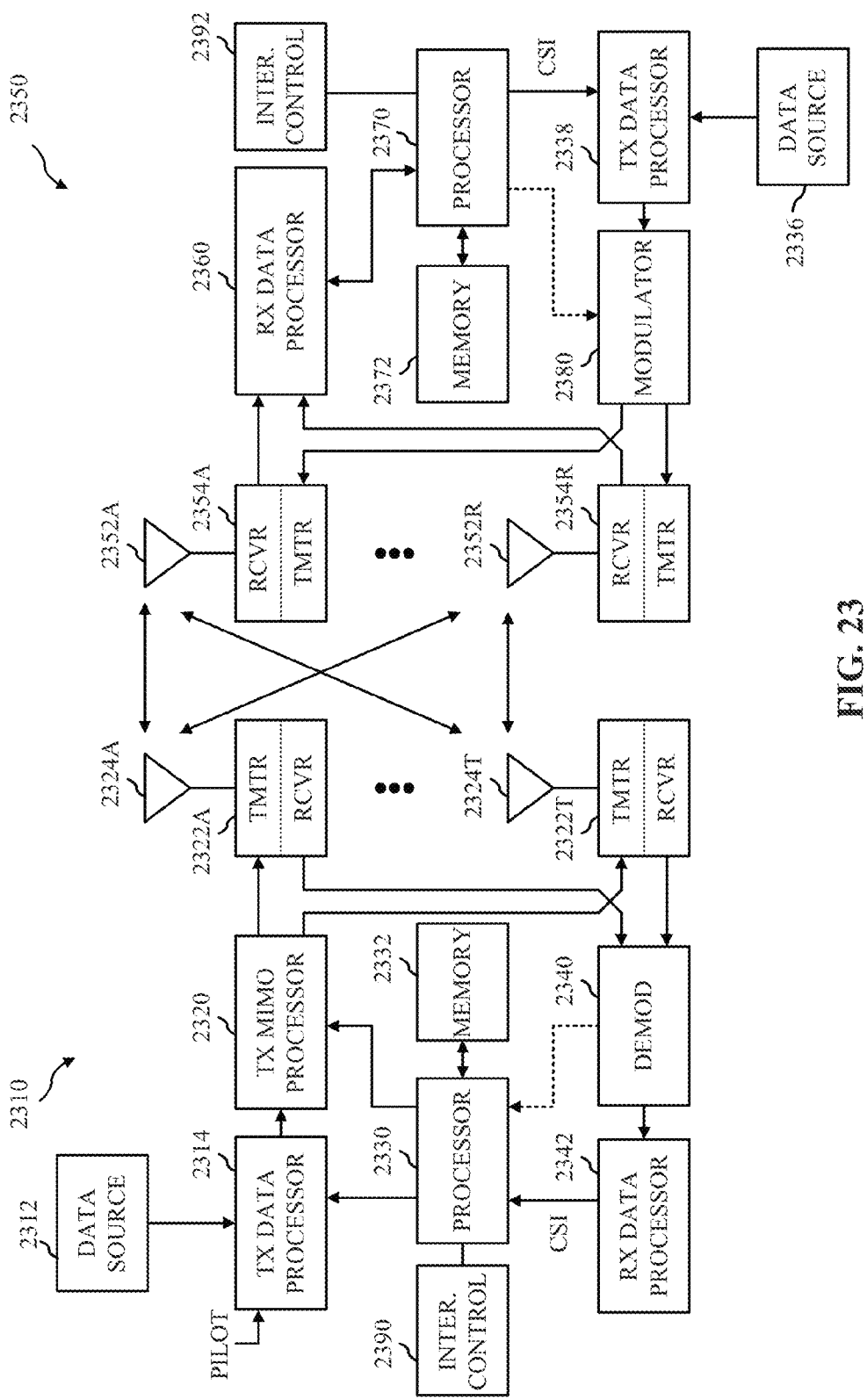
FIG. 23 depicts several sample components that can or may be employed to facilitate communication between nodes in accordance with an embodiment of the disclosed subject matter.

The teachings herein may be incorporated into a node (e.g., a device) employing various components for communicating with at least one other node. FIG. 21 depicts several sample components that may be employed to facilitate communication between nodes. Specifically, FIG. 21 illustrates a wireless device 2110 (e.g., an access point) and a wireless device 2150 (e.g., an access terminal) of a MIMO system 2100. At the device 2110, traffic data for a number of data streams is provided from a data source 2112 to a transmit ("TX") data processor 2114.

In some aspects, each data stream is transmitted over a respective transmit antenna. The TX data processor 2114 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 2130. A data memory 2132 may store program code, data, and other information used by the processor 2130 or other components of the device 2110.

The modulation symbols for all data streams are then provided to a TX MIMO processor 2120, which may further process the modulation symbols (e.g., for OFDM). The TX MIMO processor 2120 then provides $N_T$ modulation symbol streams to $N_T$ transceivers ("XCVR") 2122A through 2122T. In some aspects, the TX MIMO processor 2120 applies beam-forming weights to the symbols of the data streams and to the antenna from which the symbol is being transmitted.

Each transceiver 2122 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 2122A through 2122T are then transmitted from $N_T$ antennas 2124A through 2124T, respectively.

At the device 2150, the transmitted modulated signals are received by $N_R$ antennas 2152A through 2152R and the received signal from each antenna 2152 is provided to a respective transceiver ("XCVR") 2154A through 2154R. Each transceiver 2154 conditions (e.g., filters, amplifies, and downconverts) a respective received signal, digitizes the conditioned signal to provide samples, and further processes the samples to provide a corresponding "received" symbol stream.

A receive ("RX") data processor 2160 then receives and processes the $N_R$ received symbol streams from $N_R$ transceivers 2154 based on a particular receiver processing technique to provide $N_T$ "detected" symbol streams. The RX data processor 2160 then demodulates, deinterleaves, and decodes each detected symbol stream to recover the traffic data for the data stream. The processing by the RX data processor 2160 is complementary to that performed by the TX MIMO processor 2120 and the TX data processor 2114 at the device 2110.

A processor 2170 periodically determines which pre-coding matrix to use (discussed below). The processor 2170 formulates a reverse link message comprising a matrix index portion and a rank value portion. A data memory 2172 may store program code, data, and other information used by the processor 2170 or other components of the device 2150.

The reverse link message may comprise various types of information regarding the communication link and/or the received data stream. The reverse link message is then processed by a TX data processor 2138, which also receives traffic data for a number of data streams from a data source 2136, modulated by a modulator 2180, conditioned by the transceivers 2154A through 2154R, and transmitted back to the device 2110.

At the device 2110, the modulated signals from the device 2150 are received by the antennas 2124, conditioned by the transceivers 2122, demodulated by a demodulator ("DEMOD") 2140, and processed by a RX data processor 2142 to extract the reverse link message transmitted by the device 2150. The processor 2130 then determines which pre-coding matrix to use for determining the beam-forming weights then processes the extracted message.

FIG. 21 also illustrates that the communication components can or may include one or more components that perform interference control operations as taught herein. For example, an interference ("INTER.") control component 2190 may cooperate with the processor 2130 and/or other components of the device 2110 to send/receive signals to/from another device (e.g., device 2150) as taught herein. Similarly, an interference control component 2192 may cooperate with the processor 2170 and/or other components of the device 2150 to send/receive signals to/from another device (e.g., device 2110). It should be appreciated that for each device 2110 and 2150 the functionality of two or more of the described components may be provided by a single component. For example, a single processing component may provide the functionality of the interference control component 2190 and the processor 2130 and a single processing component may provide the functionality of the interference control component 2192 and the processor 2170.

It is to be appreciated and understood that components (e.g., UE, AP, core network, home gateway, STB, data store, display component, communication platform, remote control component, etc.), as described with regard to a particular system or method, can include the same or similar functionality as respective components (e.g., respectively named components) as described with regard to other systems or methods disclosed herein.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nanoscale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," and substantially any other information storage component relevant to operation and functionality of a component, refer to "memory components," or entities embodied in a "memory" or components comprising the memory. For example, information relevant to operation of various components described in the disclosed subject matter, and that can be stored in a memory, can comprise, but is not limited to comprising, subscriber information; cell configuration (e.g., devices served by an AP) or service policies and specifications; privacy policies; and so forth. It will be appreciated that the memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), phase change memory (PCM), flash memory, or nonvolatile RAM (e.g., ferroelectric RAM (FeRAM). Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD), Blu-ray disc (BD), . . . ), smart cards, and flash memory devices (e.g., card, stick, key drive . . . ).

What has been described above includes examples of systems and methods that provide advantages of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A first device, comprising:
a processor; and
a memory that stores executable instructions that, when executed by the processor, facilitate performance of operations, comprising:
receiving, by the first device from a second device, a message that comprises consumption data representing a consumption of a service associated with a utility provider identity for a defined period of time, wherein the first device and the second device are determined to be located at a defined physical location associated with a user identity, and wherein the second device is associated with a meter that is located at the defined physical location and monitors the consumption of the service; and
in response to receiving input information that indicates an accuracy of the consumption data via a user interface from the user identity, adding an accuracy indicator to a copy of the message that comprises the consumption data and is to be transmitted to a device associated with the utility provider identity to facilitate indicating to the device whether the consumption data is accurate, wherein the accuracy indicator indicates whether the consumption data presented in the message displayed is accurate.

2. The first device of claim 1, wherein the first device is a first wireless communication device, wherein the second device is a second wireless communication device, and wherein the receiving further comprises receiving, by the first wireless communication device from the second wireless communication device, the message via a wireless communication channel facilitated by an access point device determined to be located at the defined physical location.

3. The first device of claim 1, wherein the operations further comprise mapping the message to a dedicated channel associated with the first device to facilitate presentation of the message by the first device via the dedicated channel.

4. The first device of claim 1, wherein the operations further comprise instructing that a portion of the message be displayed on a display screen associated with the first device.

5. The first device of claim 1, wherein the operations further comprise:
receiving the accuracy indicator;
generating the copy of the message comprising the accuracy indicator; and
storing the message and the copy of the message in a data store associated with the first device.

6. The first device of claim 5, wherein the operations further comprise transmitting the copy of the message directed to the device associated with the utility provider identity to facilitate the indicating, to the device, whether the consumption data in the message is accurate.

7. The first device of claim 1, wherein the accuracy indicator is a valid indicator that indicates that the consumption data is correct.

8. The first device of claim 1, wherein the accuracy indicator is a dispute indicator that indicates there is an error in the consumption data.

9. The first device of claim 1, wherein the operations further comprise:
receiving a communication parameter in response to detection of a defined communication problem associated with the first device; and
re-configuring the first device based on the communication parameter to facilitate resolving the defined communication problem.

10. The first device of claim 1, wherein the operations further comprise:
receiving change information relating to a change in condition detected in a defined area of the defined physical location associated with the first device, wherein the change information comprises video content that comprises visual information relating to the change in condition in the defined area; and
communicating a condition-change message that comprises the change information to a third device in response to determining a defined alert criterion is satisfied.

11. A method, comprising:
receiving, by a first communication device comprising a processor from a second communication device, a message that comprises consumption data representing a consumption of a service provided by a utility provider identity for a defined period of time, wherein the second communication device is associated with a meter that monitors the consumption data representing the consumption of the service, and wherein the first communication device, the second communication device, and the meter are located at a defined location; and
in response to receiving accuracy data that indicates an accuracy of the consumption data via a user interface, incorporating, by the first communication device, an accuracy indicator in a version of the message that comprises the consumption data and is to be sent to a provider device associated with the utility provider identity to facilitate indicating to the provider device whether the consumption data is accurate, wherein the accuracy indicator indicates whether the consumption data presented in the message is accurate.

12. The method of claim 11, further comprising:
mapping, by the first communication device, a portion of the message to a dedicated portion of a display screen associated with the first communication device to facilitate displaying the portion of the message on the dedicated portion of the display screen.

13. The method of claim 11, further comprising:
receiving, by the first communication device, the accuracy indicator;
generating, by the first communication device, the version of the message comprising the accuracy indicator; and
storing, by the first communication device, the message and the version of the message in a data store associated with the first communication device.

14. The method of claim 13, further comprising:
transmitting, by the first communication device, the version of the message to the provider device associated with the utility provider identity to facilitate the indicating, to the provider device, the accuracy of the consumption data in the version of the message.

15. The method of claim 11, further comprising:
receiving, by the first communication device, a first message and a second message;
determining, by the first communication device, a first priority level associated with the first message and a second priority level associated with the second message;
determining, by the first communication device, whether the first priority level is a higher priority level as compared to the second priority level based on a comparison of the first priority level to the second priority level; and
facilitating, by the first communication device, a display of the first message with a priority indicator that indicates the first message is a higher priority message than the second message in response to determining the first priority level is the higher priority level as compared to the second priority level.

16. The method of claim 11, further comprising:
determining, by the first communication device, a priority level associated with another message received by the first communication device;
determining, by the first communication device, whether the priority level satisfies a defined threshold priority level for forwarding the other message to a third communication device; and
transmitting, by the first communication device, the other message to the third communication device in response to determining the priority level satisfies the defined threshold priority level.

17. The method of claim 11, further comprising:
initiating, by the first communication device, presenting of a message indicator that indicates that the message has been received by the first communication device.

18. The method of claim 11, further comprising:
initiating, by the first communication device, a wireless communication connection between the first communication device and the second communication device via an access point device to facilitate the receiving, by the first communication device, the message from the second communication device, wherein the wireless communication connection is facilitated via the access point device without the content share session being routed through a virtual private network tunnel to a network device of a wireless communication network.

19. A computer-readable storage device storing executable instructions that, in response to execution, cause a system comprising a processor to perform operations, comprising:
receiving, by a first device from a second device, a message that comprises consumption data representing a consumption of a service associated with a service provider identity for a defined period of time, wherein the second device is associated with a meter that monitors the consumption of the service and generates the consumption data representing the consumption of the service, and wherein the first device, the second device, and the meter are located within a defined region associated with a physical location; and
in response to receiving, via a user interface, accuracy data that indicates an accuracy of the consumption data, associating an accuracy indicator with a copy of a message that comprises the consumption data representing the consumption of the service for the defined period of time and is to be communicated to a provider device associated with the service provider identity to facilitate indicating to the provider device associated with the service provider identity whether the consumption data is accurate, wherein the accuracy indicator indicates whether the consumption data presented in the copy of the message is accurate.

20. The computer-readable storage device of claim 19, wherein the operations further comprise:
- receiving the accuracy data;
- generating the copy of the message comprising the accuracy data;
- storing the message and the copy of the message in a data store associated with the first device; and
- transmitting the copy of the message to the provider device associated with the service provider identity to facilitate the indicating, to the provider device, the accuracy of the consumption data in the copy of the message.

* * * * *